United States Patent
Park et al.

(10) Patent No.: US 9,282,833 B2
(45) Date of Patent: *Mar. 15, 2016

(54) SUPPORTING DEVICE FOR DISPLAY APPARATUS

(75) Inventors: Jae Hoo Park, Suwon-si (KR); Boo Keun Yoon, Suwon-si (KR); Sang Hak Kim, Hwaseong-si (KR); Jin Sung Kim, Seoul (KR); Woo Sung In, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,350

(22) Filed: Aug. 22, 2011

(65) Prior Publication Data

US 2011/0297807 A1  Dec. 8, 2011

Related U.S. Application Data

(63) Continuation of application No. 12/627,384, filed on Nov. 30, 2009, now Pat. No. 8,695,936.

(30) Foreign Application Priority Data

| Nov. 30, 2008 | (KR) | 10-2008-0120213 |
| Feb. 25, 2009 | (KR) | 10-2009-0015744 |
| Nov. 17, 2009 | (KR) | 10-2009-0110657 |

(51) Int. Cl.
*A47F 1/14* (2006.01)
*A47G 1/18* (2006.01)
(Continued)

(52) U.S. Cl.
CPC .............. *A47G 1/18* (2013.01); *F16M 11/125* (2013.01); *F16M 13/02* (2013.01)

(58) Field of Classification Search
CPC ...................................................... A47G 1/166
USPC ............. 248/489, 494, 466, 475.1, 544, 546, 248/492, 493, 231.91, 328, 329, 330.1, 332, 248/470, 477, 497, 498; 40/601, 757
See application file for complete search history.

(56) References Cited

U.S. PATENT DOCUMENTS

| 85,738 A | 1/1869 | Cridley |
| 1,292,956 A | 3/1870 | McConnal |

(Continued)

FOREIGN PATENT DOCUMENTS

| CN | 2203489 | 7/1995 |
| CN | 2244880 | 1/1997 |

(Continued)

OTHER PUBLICATIONS

Online Webster Dictionary, http://www.merriam-webster.com/dictionary/buffer, pp. 1-4.*

(Continued)

*Primary Examiner* — Kimberly Wood
(74) *Attorney, Agent, or Firm* — Staas & Halsey LLP

(57) ABSTRACT

A supporting device of a display apparatus to prevent a wire from separating from a wire hanger. The supporting device to fix the display apparatus to a wall includes a wire part coupled to the display apparatus, a wire hanger mounted to the wall, the wire hanger to hang the wire part on the wall, and a separation protector provided at the wire hanger, the separation protector serving to prevent the wire part from separating from the wire hanger.

10 Claims, 29 Drawing Sheets

(51) Int. Cl.
*F16M 11/12* (2006.01)
*F16M 13/02* (2006.01)

(56) References Cited

U.S. PATENT DOCUMENTS

| | | | |
|---|---|---|---|
| 146,269 A | | 1/1874 | Niles |
| D8,036 S | | 2/1875 | Ray |
| 100,355 A | | 2/1875 | Baumgartner |
| 238,621 A | | 3/1881 | Walker |
| 315,614 A | | 4/1885 | Hall |
| 358,069 A | | 2/1887 | Pratt |
| 406,255 A | | 7/1889 | Brinkerhoff |
| 417,805 A | * 12/1889 | Beaman .................. 248/494 |
| 458,711 A | | 9/1891 | Green |
| 549,505 A | | 11/1895 | Eldridge |
| 579,552 A | * | 3/1897 | Austin .................. 24/135 R |
| 640,357 A | | 1/1900 | Baumgarten |
| 696,510 A | | 4/1902 | Still |
| 755,804 A | | 3/1904 | Smith |
| 769,695 A | * | 9/1904 | Gurr .................. 248/492 |
| 769,794 A | | 9/1904 | Fowler |
| 883,201 A | | 3/1908 | Johnson |
| 1,262,951 A | | 4/1918 | Houff |
| 1,675,282 A | * | 6/1928 | Strand .................. 248/494 |
| 1,675,771 A | | 7/1928 | Sterling |
| 1,907,495 A | | 5/1933 | Brunski |
| 2,384,478 A | * | 9/1945 | Lapeyre .................. 248/497 |
| 2,506,519 A | * | 5/1950 | Rollins .................. 248/494 |
| 2,643,840 A | * | 6/1953 | Lanman .................. 248/494 |
| D189,241 S | | 11/1960 | Morrill |
| 3,049,323 A | | 8/1962 | Peterka |
| 3,063,669 A | | 11/1962 | Bell |
| 3,143,915 A | | 8/1964 | Tendler |
| 3,384,987 A | | 5/1968 | Prechtl |
| 3,451,362 A | | 6/1969 | Welch et al. |
| 3,995,821 A | | 12/1976 | Einhorn |
| 4,026,510 A | | 5/1977 | Holmes |
| 4,108,560 A | | 8/1978 | Minogue |
| 4,162,056 A | | 7/1979 | Moorhead |
| D262,687 S | | 1/1982 | Collett |
| 4,309,017 A | * | 1/1982 | Slemmons .................. 248/495 |
| 4,364,538 A | | 12/1982 | Tomlinson |
| 4,614,053 A | | 9/1986 | Billman |
| 5,096,149 A | | 3/1992 | Riese |
| 5,100,094 A | | 3/1992 | Handwerger et al. |
| 5,603,472 A | | 2/1997 | Hutter, III |
| 5,669,593 A | | 9/1997 | Kirchner |
| 5,743,507 A | | 4/1998 | Rushing |
| 5,769,511 A | | 6/1998 | Hattori |
| 5,803,425 A | | 9/1998 | McCoy, II |
| 5,921,518 A | | 7/1999 | Bernardi |
| 5,947,438 A | | 9/1999 | Lemire |
| 6,591,528 B2 | * | 7/2003 | Ellingsen .................. 40/601 |
| 6,820,853 B1 | * | 11/2004 | DuBarry .................. 248/489 |
| 6,923,413 B2 | | 8/2005 | Dozier |
| 7,216,841 B2 | | 5/2007 | Dodig, Jr. |
| 7,471,804 B2 | | 12/2008 | Lee |
| 7,513,477 B2 | * | 4/2009 | Lampert .................. 248/493 |
| 7,533,863 B1 | * | 5/2009 | Frericks .................. 248/494 |
| 7,540,456 B2 | | 6/2009 | Thompson |
| 7,713,013 B2 | | 5/2010 | Sedgwick et al. |
| 7,883,069 B2 | * | 2/2011 | Park et al. .................. 248/328 |
| 2006/0006296 A1 | | 1/2006 | Morita |
| 2007/0183866 A1 | | 8/2007 | Gallien |
| 2007/0252056 A1 | | 11/2007 | Novin |
| 2009/0057513 A1 | | 3/2009 | Wu |
| 2009/0278018 A1 | * | 11/2009 | Park et al. .................. 248/492 |
| 2010/0012799 A1 | | 1/2010 | Sexton |

FOREIGN PATENT DOCUMENTS

| | | | |
|---|---|---|---|
| CN | 2255775 | 6/1997 | |
| CN | 1652257 | 8/2005 | |
| GB | 384616 | 12/1932 | |
| GB | 2100124 A | * 12/1982 | .............. A47G 1/16 |
| JP | 7-1861 | 1/1995 | |
| JP | 9-56552 | 3/1997 | |
| JP | 9-191989 | 7/1997 | |
| JP | 10-174021 | 6/1998 | |
| JP | 2002006771 | 1/2002 | |
| JP | 2006-30310 | 2/2006 | |
| JP | 2007-54094 | 3/2007 | |
| JP | 4547425 | 9/2010 | |
| KR | 10-2002-0057425 | 7/2002 | |
| KR | 10-2002-0078869 | 10/2002 | |
| KR | 10-2005-0070839 | 7/2005 | |
| KR | 10-2006-0049896 | 5/2006 | |
| KR | 10-2006-0055952 | 5/2006 | |
| KR | 10-2007-0022911 | 2/2007 | |
| KR | 10-2007-0048705 | 5/2007 | |
| KR | 10-2008-0105151 | 12/2008 | |

OTHER PUBLICATIONS

Chinese Office Action dated Dec. 17, 2013 issued in CN Application No. 201210056608.7.
Chinese Office Action mailed Jul. 15, 2014 in corresponding Chinese Application No. 201210056648.1.
U.S. Office Action mailed Sep. 12, 2014 in copending U.S. Appl. No. 13/214,330.
U.S. Final Office Action mailed Aug. 1, 2014 in copending U.S. Appl. No. 13/214,330.
U.S. Office Action mailed Mar. 21, 2014 in copending U.S. Appl. No. 13/214,330.
U.S. Final Office Action mailed Dec. 9, 2013 in copending U.S. Appl. No. 13/214,330.
U.S. Office Action mailed Jul. 25, 2013 in copending U.S. Appl. No. 13/214,330.
U.S. Office Action mailed Mar. 19, 2013 in copending U.S. Appl. No. 13/214,330.
U.S. Final Office Action mailed Sep. 24, 2012 in copending U.S. Appl. No. 13/214,330.
U.S. Office Action mailed Apr. 4, 2012 in copending U.S. Appl. No. 13/214,330.
U.S. Office Action mailed Aug. 28, 2014 in copending U.S. Appl. No. 13/362,424.
U.S. Final Office Action mailed Apr. 21, 2014 in copending U.S. Appl. No. 13/362,424.
U.S. Office Action mailed Oct. 3, 2013 in copending U.S. Appl. No. 13/362,424.
U.S. Final Office Action mailed Jun. 14, 2013 in copending U.S. Appl. No. 13/362,424.
U.S. Office Action mailed Jan. 17, 2013 in copending U.S. Appl. No. 13/362,424.
U.S. Final Office Action mailed Aug. 27, 2012 in copending U.S. Appl. No. 13/362,424.
U.S. Office Action mailed Mar. 26, 2012 in copending U.S. Appl. No. 13/362,424.
U.S. Appl. No. 13/214,330, filed Aug. 22, 2011, Jae Hoo Park et al., Samsung Electronics Co., Ltd.
U.S. Appl. No. 13/362,424, filed Jan. 31, 2012, Jae Hoo Park et al., Samsung Electronics Co., Ltd.
Supplemental Notice of Allowance mailed Mar. 27, 2015 for copending U.S. Appl. No. 13/362,424.
Notice of Reopening of Prosecution mailed May 12, 2015 for copending U.S. Appl. No. 13/362,424.
U.S. Office Action issued Sep. 3, 2015 in copending U.S. Appl. No. 13/362,424.

* cited by examiner

SUPPORTING DEVICE FOR DISPLAY APPARATUS

CROSS-REFERENCE TO RELATED APPLICATIONS

This application is a Continuation Application of prior application Ser. No. 12/627,384, filed on Nov. 30, 2009 now U.S. Pat. No. 8,695,936, in the United States Patent and Trademark Office, which claims priority under 35 U.S.C. §119(a) of Korean Patent Applications No. 10-2008-120213, filed on Nov. 30, 2008, No. 10-2009-15774, filed on Feb. 25, 2009, and No. 10-2009-110657, filed on Nov. 17, 2009 in the Korean Intellectual Property Office, the disclosures of which are incorporated herein by reference.

BACKGROUND

1. Field of the Invention

Embodiments of the present general inventive concept relate to a supporting device to a display apparatus, which is devised to fix the display apparatus to a wall by use of a wire.

2. Description of the Related Art

A display apparatus is one type of screen output apparatus, such as televisions, computer monitors, etc., and is currently used in homes, offices, and the like. In recent years, a flat panel type display body having a thin thickness and small volume, such as a Liquid Crystal Display (LCD), Plasma Display Panel (PDP), etc., has been developed and widely used, and demand therefor is gradually increasing.

Such a flat panel type display apparatus having a thin thickness may assure more effective space utilization when mounted to a wall, thus exhibiting convenience of use. For this reason, a variety of supporting devices to mount a display apparatus to a wall have been developed.

As one example of a supporting device to a display apparatus, a supporting device, which is configured to fix a display apparatus to a wall by use of a wire similar to the manner in which a picture frame is hung on a wall, may be contemplated.

In consideration of the relatively heavy weight of a display apparatus, the wire used in the above-described supporting device may have strength sufficient to support the heavy weight of the display apparatus. In this case, the wire may be thick and also, may be made of strong materials, such as metals, thus exhibiting low flexibility.

If a display apparatus is mounted to a wire hanger provided on a wall by use of the above-described wire, the wire connected to the display apparatus may be moved in response to motion of the display apparatus, for example, upon horizontal adjustment of the display apparatus, thereby being problematically separated from the wire hanger.

SUMMARY

Therefore, it is an aspect of the present general inventive concept to provide a supporting device to a display apparatus, which is devised to prevent a wire from separating from a wire hanger.

Additional features and utilities will be set forth in part in the description which follows and, in part, will be obvious from the description, or may be learned by practice of the general inventive concept.

In accordance with an aspect of the present general inventive concept, a supporting device to a display apparatus to fix the display apparatus to a wall may include a wire part to couple to the display apparatus, a wire hanger to mount to the wall and to hang the wire part on the wall, and a separation protector provided at the wire hanger to prevent the wire part from being separated from the wire hanger.

The wire hanger may include a receiving portion to catch the wire part.

The separation protector may be mounted to surround a periphery of the receiving portion.

The separation protector may be made of an elastic material.

The wire hanger may include a head portion having a first radius, a wall supporting portion having a second radius and arranged in contact with the wall, and a receiving portion having a radius smaller than the first and second radii, on which one side of the wire part is received.

The separation protector may include a body to be mounted on an outer periphery of any one of the head portion and the wall supporting portion, and at least one protrusion protruding from the body toward the receiving portion.

The protrusion may be formed with a stepped portion to surround the wire part.

The protrusion may be made of a rubber material.

The wire part may include a wire and a coupling piece provided at a portion of the wire and configured to be coupled with the wire hanger.

The coupling piece may include a loop through which the wire may be inserted, and a first large-diameter portion to be coupled with the wire hanger and supported by the separation protector.

The wire hanger may include an insertion recess into which the first large-diameter portion may be inserted, and the separation protector may extend longitudinally from one side of the insertion recess.

At least one of the insertion recess and the first large-diameter portion may have a tapered portion to allow the first large-diameter portion to be smoothly inserted into the insertion recess.

At least one of the insertion recess and the first large-diameter portion may be provided with a permanent magnet.

Embodiments of the present general inventive concept include a supporting device to a display apparatus to fix the display apparatus to a wall, wherein the supporting device may include a wire part to couple to the display apparatus, a wire hanger to mount to the wall and having a receiving portion to support a portion of the wire part coupled to the display apparatus, and a separation protector to cover the portion of the wire part.

The wire hanger may include a head portion provided at a front side of the receiving portion and a wall supporting portion provided at a rear side of the receiving portion.

The separation protector may be bent from at least one of the head portion and the wall supporting portion to the receiving portion.

The separation protector may include a body to be mounted on at least one of the head portion and the wall supporting portion, and at least one protrusion protruding from the body toward the receiving portion.

The protrusion may be formed with a stepped portion to surround the wire part.

Embodiments of the present general inventive concept further include a mount to an imaging unit, including a wire configuration to fix to a rear surface of the imaging unit, a wire hanger to attach to a reference surface and hang the wire configuration, and a spacing member to maintain the distance between the rear surface and the reference surface, wherein the wire configuration hangs in manner to prevent separation from the wire hanger.

The mount may further include a separation protector attached to the wire hanger to prevent separation of the wire configuration from the wire hanger.

The wire configuration may include a fixing unit to fix to the rear surface and a wire part connected to the fixing unit.

The wire part may connect to the fixing unit by wrapping around an inner portion of the fixing unit.

The wire part may include a wire part length to prevent the wire part from being visible when the display apparatus is mounted to the wall.

Embodiments of the present general inventive concept further include an adjustable stand to support artwork, including a wire configuration to fix to the artwork, and a wire hanger to attach to an exterior surface and prevent separation of the wire configuration with the wire hanger, wherein the wire configuration is capable of slidable insertion within the wire hanger.

The wire hanger may further include a magnet to assist via magnetic force the insertion of the wire configuration into the wire hanger.

Embodiments of the present general inventive concept further include a supporting device to a display apparatus to fix the display apparatus to a wall, including a wire part to be supported on the wall, and a fixing unit to couple the wire part to the display apparatus, wherein the fixing unit may be separably coupled to the wire part.

The supporting device may include a plurality of wire parts, and the fixing unit may be selectively coupled to any one of the plurality of wire parts.

Any one of the plurality of wire parts may be selected according to a size of the display apparatus.

Each of the plurality of wire parts may have a different length.

The wire part and the fixing unit may be coupled to or separated from each other via screw fastening.

The wire part may further include a separation protector having a male screw shape, and the fixing unit may further include a wire insertion hole having a female screw shape.

The wire part may have a ball provided at an end thereof, the fixing unit may further include a first case and a second case separably coupled to each other, and the ball may be provided between the first case and the second case, the ball being coupled to the fixing unit when the first case and the second case are coupled to each other, and being separated from the fixing unit when the first case and the second case are separated from each other.

The first case and the second case may be coupled to or separated from each other via hook coupling.

The first case may take the form of a loop, and may further include a ball seat indented from an inner peripheral surface thereof, and a wire insertion hole cut from an upper surface thereof to the ball seat.

The wire insertion hole may have a diameter smaller than that of the ball.

The second case may be inserted into the first case and may further include a cover to support an upper portion of the first case and a stepped portion to support a lower portion of the first case.

The wire part may further include at least one separation protector provided at an end thereof, the fixing unit may further include an anti-separation recess for entrance/exit of the at least one separation protector, and the fixing unit may further include an anti-separation pin separably inserted in the anti-separation recess to intercept an escape of the at least one separation protector.

Embodiments of the present general inventive concept further includes a supporting device to a display apparatus to fix the display apparatus to a wall, the supporting device including a selected one of a plurality of wire parts to be supported on the wall, and a fixing unit coupled to the selected one of the plurality of wire parts, the fixing unit being mounted to the display apparatus, wherein the fixing unit may be separated from the selected one of the plurality of wire parts and thereafter, may be coupled to another selected one of the plurality of wire parts.

Embodiments of the present general inventive concept further includes a supporting device to a display apparatus to fix the display apparatus to a wall, the supporting device including a wire part to be supported on the wall, and a fixing unit arranged between the display apparatus and the wall, wherein the fixing unit may include a case to couple to the wire part, a fastening member to fix the case to the display apparatus, and a height adjusting member arranged between the display apparatus and the wall together with the case to adjust a distance between the display apparatus and the wall.

The height adjusting member may be coupled to the case so as to be movable relative to the case.

The height adjusting member may be screwed to the case.

The fastening member and the height adjusting member may be integrated to form a single unit, and the integrated unit may be coupled to the case so as to be movable relative to the case.

The integrated unit may be screwed to the case.

Embodiments of the present general inventive concept further includes a supporting device to a display apparatus to fix the display apparatus to a wall, the supporting device including a wire part to be supported on the wall, and a fixing unit arranged between the display apparatus and the wall, wherein the fixing unit may include a case to couple to the wire part; and a fastening member to fix the case to the display apparatus, and the fastening member is coupled to the case so as to be movable relative to the case.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
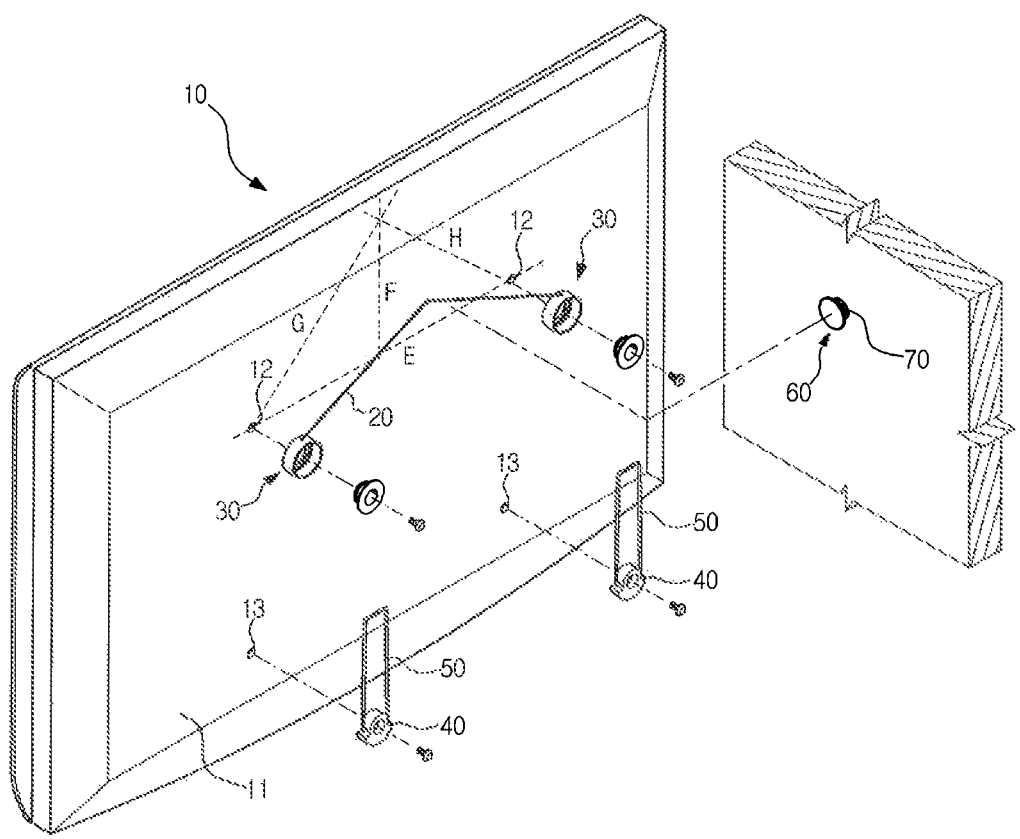
FIG. 1 is an exploded perspective view illustrating the overall outer appearance of a supporting device to a display apparatus according to an exemplary embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below in order to explain the present general inventive concept by referring to the figures.

Embodiments of the present general inventive concept include a supporting device to a display apparatus, which will be described with reference to the accompanying drawings.

Figure 2:
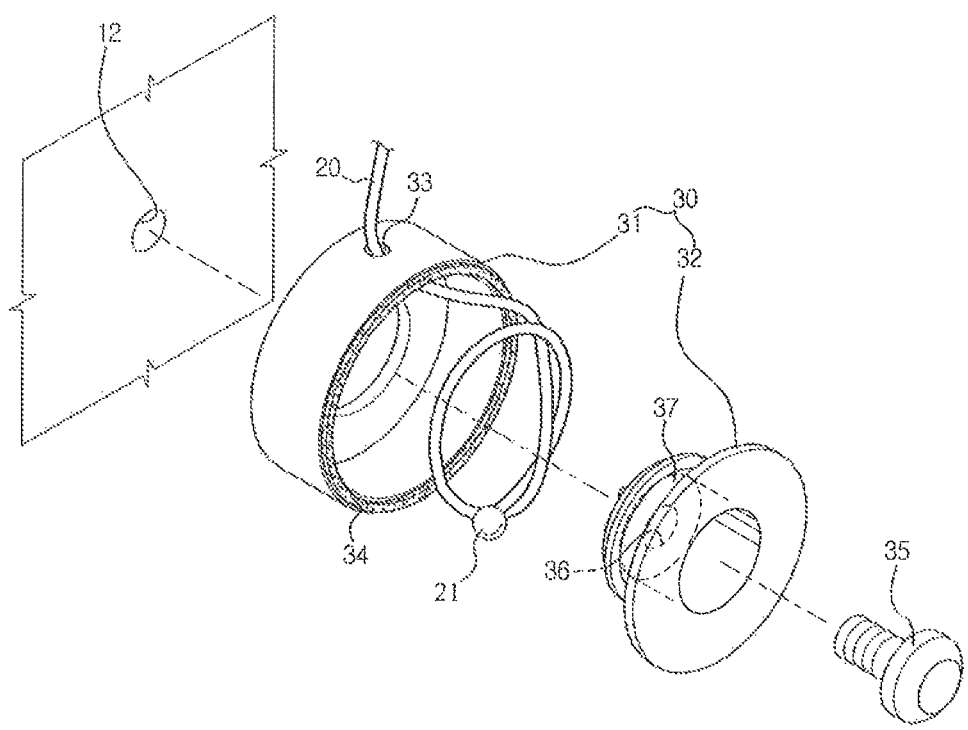
FIG. 2 is an assembly view of a fixing unit provided in the supporting device to a display apparatus according to an exemplary embodiment of the present general inventive concept.
Figure 3:
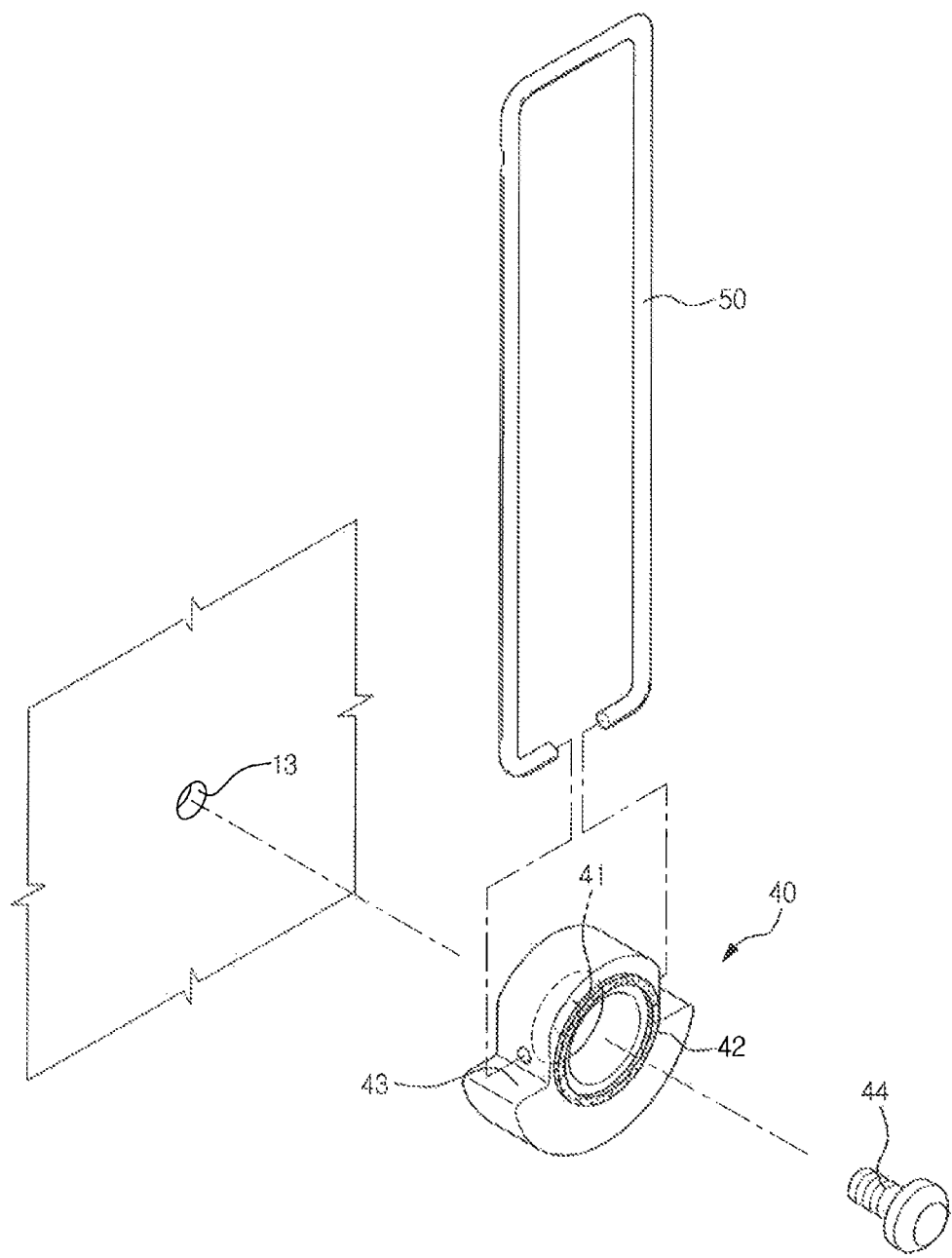
FIG. 3 is an assembly view of a spacing member and a rotating arm provided in the supporting device to a display apparatus according to an exemplary embodiment of the present general inventive concept.

FIG. 1 is an exploded perspective view illustrating the overall outer appearance of a supporting device to a display apparatus according to an exemplary embodiment of the present general inventive concept. FIG. 2 is an assembly view of a fixing unit provided in the supporting device to a display apparatus according to an exemplary embodiment, and FIG. 3 is an assembly view of a spacing member and a rotating arm provided in the supporting device to a display apparatus according to an exemplary embodiment.

The supporting device to a display apparatus according to an embodiment of the present general inventive concept, as illustrated in FIG. 1, may include a wire part 20 having both ends coupled to a rear surface 11 of a display apparatus 10, fixing units 30 to couple the wire part 20 to the rear surface 11 of the display apparatus 10 while spacing the rear surface 11 of the display apparatus 10 from a wall, and spacing members 40 to mount to the rear surface 11 of the display apparatus 10 at positions below the respective fixing units 30 and to allow the rear surface 11 of the display apparatus 10 to be arranged substantially parallel to the wall.

The wire part 20 serves to connect the display apparatus 10 to a wire hanger 60, which will be described hereinafter. The wire part 20 may be made of a metal material to withstand a weight of the display apparatus 10. The wire part 20 may be fabricated by twisting a plurality of metal threads and covering the twisted threads.

Both the ends of the wire part 20 are coupled to opposite sides of the rear surface 11 of the display apparatus 10.

The rear surface 11 of the display apparatus 10 has a plurality of holes 12 and 13 indented perpendicular to the rear surface 11. The plurality of holes 12 and 13 include a pair of upper holes 12 and a pair of lower holes 13. The upper holes 12 may be located at upper opposite sides of the rear surface 11 and may be used to couple the wire part 20. The lower holes 13 may be located at lower opposite sides of the rear surface 11 and may be used to couple the spacing members 40.

The upper holes 12 are indented in an upper part of the rear surface 11 of the display apparatus 10 at positions opposite each other.

The wire part 20 may be longer than a distance E between the pair of upper holes 12, but shorter than a sum of distances G and H between each of the upper holes 12 and a point where a vertical line F passing a center between the pair of upper holes 12 meets an upper end of the display apparatus 10. This wire part length may prevent the wire part 20 from being visible at the outside of the display apparatus 10 when the display apparatus 10 is mounted to the wall, thus assuring an aesthetic outer appearance of the display apparatus 10.

In addition, the length of the wire part 20 may be changed according to a size of the display apparatus 10. Since the sum of the distances G and H between each of the upper holes 12 and the above described point is changed according to variation in the size of the display apparatus 10, it may be necessary to change the length of the wire part 20. Accordingly, to mount the display apparatus 10, an operator may select any one wire part 20 having an appropriate length from among a plurality of wire parts 20 having different lengths according to the size of the display apparatus 10.

Here, the length of the wire part 20 is measured excluding knots formed by balls 21 which will be described hereinafter. That is, an actual length of the wire part 20 may be determined by adding a length of the knots, serving as separation protectors, to the above-described length.

Both the ends of the wire part 20 are bound to the fixing units 30 and in turn, the fixing units 30 are screwed respectively into the upper holes 12.

Each of the fixing units 30, as illustrated in FIG. 2, may include a first case 31 defining an outer appearance of the fixing unit 30 and a second case 32 coupled into the first case 31, the second case 32 internally defining a space for winding of the end of the wire part 20.

The first case 31 may be perforated in an outer periphery thereof with a wire insertion hole 33, through which the end of the wire part 20 is guided into the fixing unit 30. Also, a first buffer member 34 is attached to a rear rim of the first case 31, to prevent damage and noise caused upon collision with the wall.

Each end of the wire part 20 is provided with the ball 21 to correspond to the wire insertion hole 33. The ball 21 serves to prevent the wire part 20 from being separated from the fixing unit 30 and for this, the ball 21 has a radius larger than a radius of the wire insertion hole 33.

The ball 21 may be formed at the end of the metallic wire part 20 via, e.g., double injection molding, to have a diameter larger than a thickness of the wire part 20.

Accordingly, after both ends of the wire part 20 are inserted through the wire insertion holes 33 perforated in the first cases 31 of the pair of fixing units 30, the balls 21 may form at the respective ends of the wire part 20 via, e.g., double injection molding, thus preventing the wire part 20 from separating from the fixing units 30.

The second case 32 has a center screw hole 36, through which a fastening screw 35 may be inserted, and a cylindrical portion 37 around the center screw hole 36. In a state wherein the second case 32 is coupled into the first case 31, the end of the wire part 20 may be wound on the cylindrical portion 37.

The second case 32 may be integrally formed with the coupling screw 35. In this case, the fixing unit 30 may be directly screwed into the upper hole 12.

The end of the wire part 20 may be fixedly maintained in a wound state within a space defined by the first case 31 and the second case 32. As illustrated in FIG. 2, the end of the wire part 20 is first wound on the cylindrical portion 37 and then, the ball 21 is formed at the end of the wire part 20 to form a knot.

Even if a great load is used with the wire part 20 when the display apparatus 10 is mounted to the wall, thus causing the wire part 20 to be pulled with an excessive pulling force, the knot of the ball 21 keeps the wire part 20 caught by the fixing unit 30, thereby allowing the wire part 20 to support even the great load.

The spacing members 40 may be fastened respectively to the lower holes 13 and serve to keep a predetermined distance between the rear surface 11 of the display apparatus 10 and the wall, so as to allow the display device 10 to be installed parallel to the wall.

Each of the spacing members 40, as illustrated in FIG. 3, is centrally perforated with a screw insertion hole 41 to allow screw fastening. Also, a second buffer member 42 is attached to a rear surface of the spacing member 40 which may come into contact with the wall, to dampen shock caused when the display apparatus 10 comes into contact with the wall.

The spacing member 40 may have a thickness sufficient to allow a lower part of the display apparatus 10 to be spaced apart from the wall by a predetermined distance, so as to keep the display apparatus 10 parallel to the wall.

The thickness of the spacing member 40 is substantially equal to a thickness of the fixing unit 30, to keep the display apparatus 10 parallel to the wall.

The first and second buffer members 34 and 42 are supported respectively by the wall and serve to prevent damage to the display apparatus 10. For example, although the first and second buffer members 34 and 42 may be made of rubber, various other materials functioning to absorb shock may be used.

A rotating arm 50 to tilt the display apparatus 10 may be rotatably mounted to the spacing member 40.

Although the rotating arm 50 may be mounted in a vertically or horizontally rotatable manner, an exemplary embodiment of the present general inventive concept focuses on the vertical rotatability of the rotating arm 50 by way of example.

The spacing member 40 includes a supporting portion 43 to prevent excessive rotation of the rotating arm 50.

The spacing member 40 may attach to the rear surface 11 of the display apparatus 10 via insertion of a spacing member fastening screw 44 into the hole 13, as illustrated in FIG. 3.

Although the upper and lower holes 12 and 13, to which the fixing units 30 and spacing members 40 are fixed, may be indented in arbitrary positions of the rear surface 11 of the display apparatus 10 perpendicular to the rear surface 11, the upper and lower holes 12 and 13 may be so-called VESA holes processed in the rear surface 11 of the display apparatus 10 to comply with Video Electronics Standards Association (VESA) wall-mount standards. Using the VESA holes without additional hole-processing of the display apparatus 10, the fixing units 30 connected with the wire part 20 and the spacing members 40 may be simply fixed to the display apparatus 10.

Figure 4:
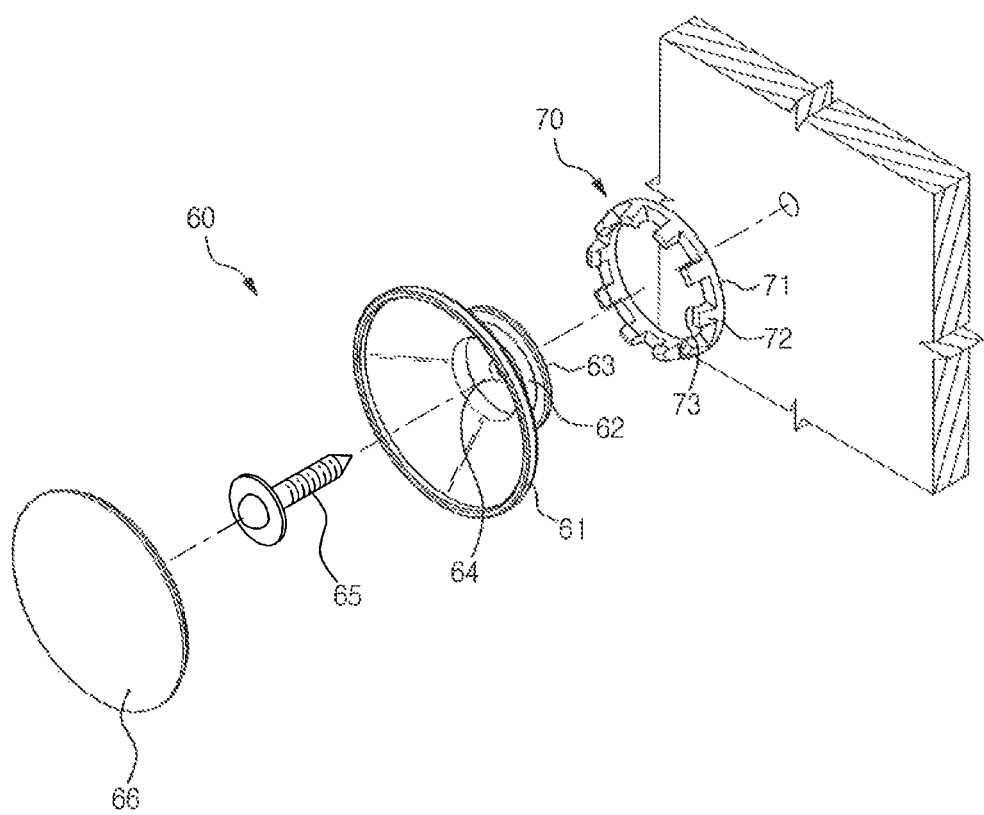
FIG. 4 is an exploded perspective view of a wire hanger and a separation protector provided in the supporting device to a display apparatus according to an exemplary embodiment of the present general inventive concept.
Figure 5:
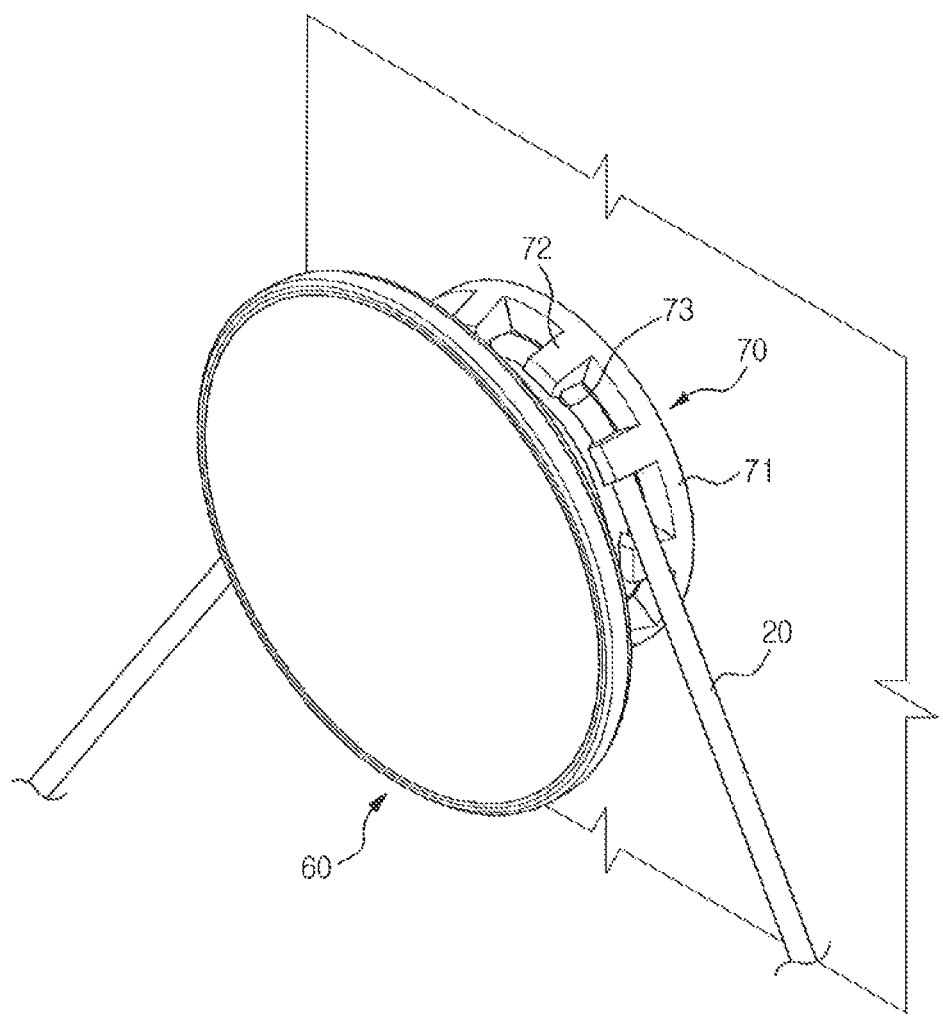
FIG. 5 is a perspective view illustrating a coupled state of the wire hanger and separation protector provided in the supporting device to a display apparatus according to an exemplary embodiment of the present general inventive concept.

FIG. 4 is an exploded perspective view of a wire hanger 60 and a separation protector 70 provided in the supporting device to a display apparatus 10 according to an exemplary embodiment of the present general inventive concept. FIG. 5 is a perspective view illustrating a coupled state of the wire hanger 60 and separation protector 70 provided in the supporting device to a display apparatus 10 according to an exemplary embodiment, and FIG. 6 is a partial sectional view of the wire hanger 60 and separation protector 70 coupled to each other according to an exemplary embodiment.

Figure 6:
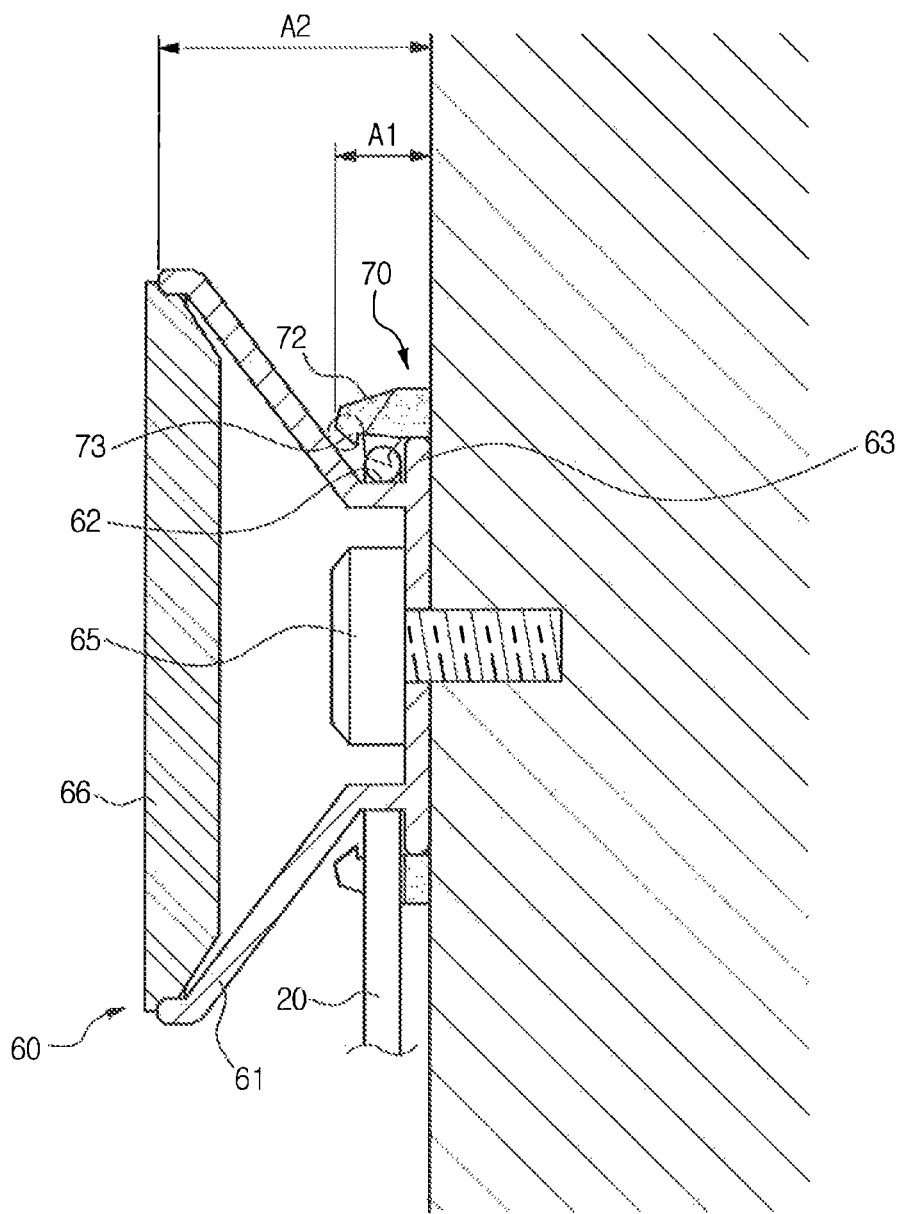
FIG. 6 is a partial sectional view of the wire hanger and separation protector coupled to each other according to an exemplary embodiment of the present general inventive concept.

The supporting device to a display apparatus 10 according to an exemplary embodiment of the present general inventive concept, as illustrated in FIGS. 4 to 6, may include the wire hanger 60 using which the display apparatus 10 coupled with the wire part 20 is mounted to the wall, and a separation protector 70 to prevent the wire part 20 from being separated from the wire hanger 60.

The wire hanger 60 serves to fix the wire part 20 to the wall, to support a weight of the display apparatus 10.

The wire hanger 60, as illustrated in FIGS. 4 and 5, includes a head portion 61, a receiving portion 62 provided at the rear of the head portion 61, on which one side of the wire part 20 is seated, and a wall supporting portion 63 provided at the rear of the receiving portion 62 so as to come into contact with the wall.

The wire hanger 60 is centrally formed with a screw hole 64, to fasten the wire hanger 60 to the wall. As a screw 65 is inserted through the screw hole 64 to thereby be fastened into the wail, the wire hanger 60 is fixed to the wall.

The head portion 61 is tapered rearward for easy mounting of the wire part 20. A cap 66 is fitted into a front rim of the head portion 61, to prevent the screw 65 from being exposed to the outside.

The receiving portion 62 can have a radius smaller than radii of the head portion 61 and wall supporting portion 63 and may serve to prevent the wire part 20, caught by the receiving portion 62, from being separated from the wire hanger 60.

The separation protector 70 is made of an elastic material, such as rubber, etc. The separation protector 70 may mount to the wire hanger 60, so as to surround a periphery of the receiving portion 62.

Also, A1 illustrates the distance in which protrusion 72 extends from the wall while assembled around the wire hanger 60, A2 illustrates the distance in which the head 61 extends from the wall when mounted to the wall.

The separation protector 70 includes a body 71 coupled around an outer periphery of the wall supporting portion 63, and at least one protrusion 72 protruding forward from the body 71 to cover the receiving portion 62.

Figure 7:
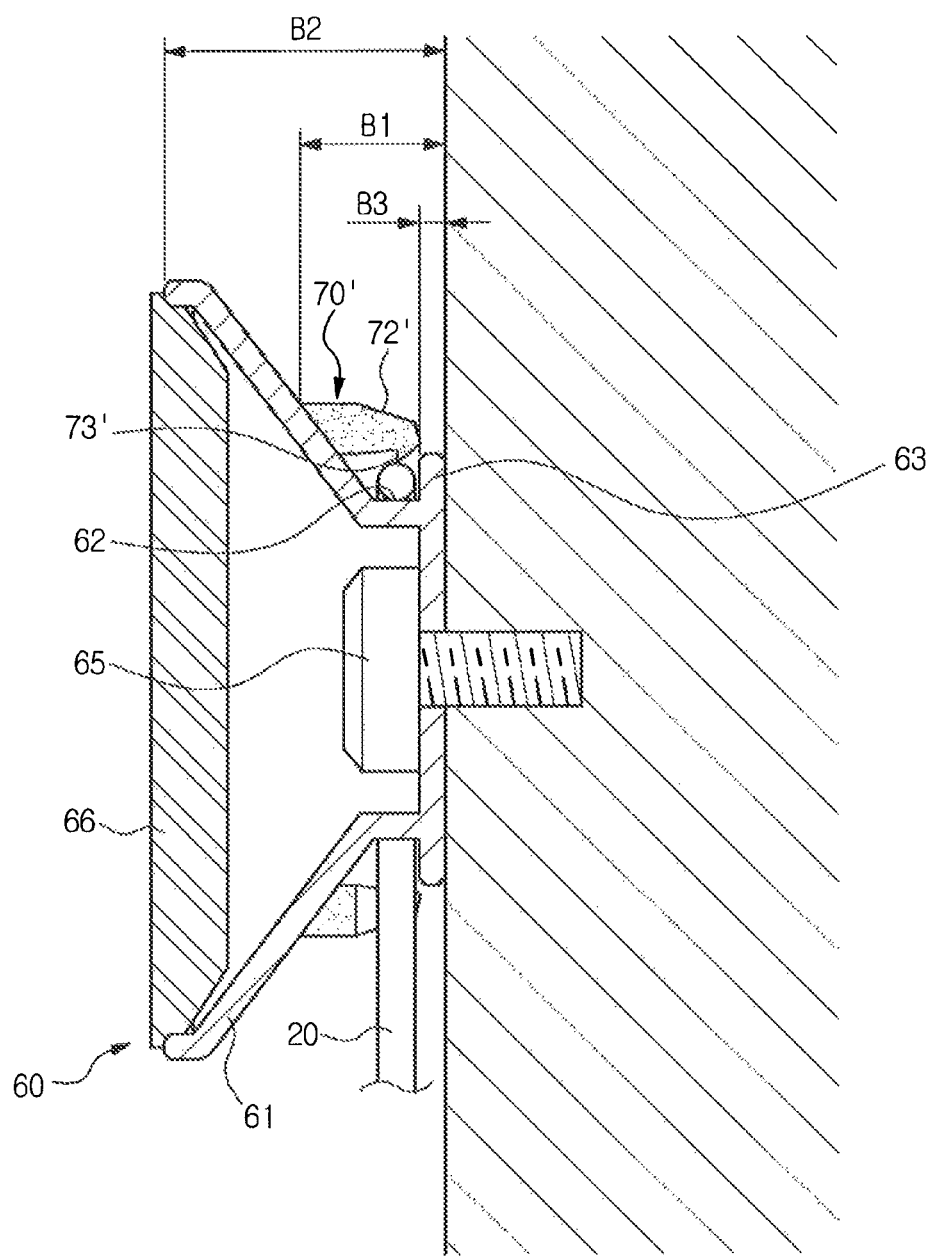
FIG. 7 is an exploded perspective view illustrating a wire hanger and a separation protector according to an exemplary embodiment of the present general inventive concept.

Although the body 71, as illustrated in FIG. 4, is coupled around the outer periphery of the wall supporting portion 63, alternatively, as illustrated in FIG. 7, a separation protector 70' may be mounted to the tapered head portion 61 such that a protrusion 72' thereof faces the wall.

Furthermore, B1 illustrates the distance in which the protrusion 72' extends from the base of the separation protector 70'. B2 illustrates the distance in which the head 61 extends from the wall when mounted to the wall. B3 illustrates the width of the wall supporting portion 63.

The protrusion 72 may be made of an elastic material, such as rubber, etc., and have a stepped portion 73 at a distal end thereof to surround the wire part 20.

Accordingly, after the wire hanger 60 coupled with the separation protector 70 is mounted to the wall, the cap 66 is fitted into the head portion 61 to cover the head portion 61, completing mounting of the wire hanger 60.

Thereafter, if the wire part 20, which is coupled with the display apparatus 10, is hung on the wire hanger 60, the wire part 20 is moved downward along the rearwardly tapered head portion 61 toward the receiving portion 62. Once the wire part 20 is moved onto the receiving portion 62, one side of the wire part 20 is inserted into a gap between the protrusion 72 of the separation protector 70 and the head portion 61 under the influence of a weight of the display apparatus 10. Movement of the wire part 20 is stopped once the wire part 20 is completely inserted into the gap.

The wire part 20 connected to the display apparatus 10 may move in response to motion of the display apparatus 10, for example, an operation to horizontally balance the display apparatus 10. The separation protector 70 coupled with the wire hanger 60 may prevent the wire part 20 from being separated from the wire hanger 60 despite the movement of the wire part 20.

An operation to mount the wire hanger 60, provided in the supporting device to a display apparatus according to an exemplary embodiment of the present general inventive concept, to the wall will now be described.

FIGS. 10A to 10D are sequential views illustrating an operation to mount the wire hanger, according to an exemplary embodiment of the present general inventive concept, to a wall.

First, as illustrated in FIG. 10A, a hole may form in the wall by use of, e.g., a drill. Then, an anchor 67, suitable to support a weight of a display apparatus 10, may insert into the hole, as illustrated in FIG. 10B, and the wire hanger 60 coupled with the separation protector 70 may be positioned at the hole of the wall as illustrated in FIG. 10C. Then, as the screw 65 is fastened through the wire hanger 60, the anchor 67 is pushed to firmly come into close contact with an inner surface of the hole in the wall, providing a force sufficient to withstand the weight of the display apparatus 10. Thereafter, the cap 66 is fitted to the wire hanger 60, completing fixation of the wire hanger 60.

In this case, the anchor 67 may be, e.g., a plug anchor.

Thereafter, as illustrated in FIG. 5, the wire part 20 coupled with the display apparatus may be hung on the wire hanger 60, completing installation of the display apparatus 10.

A fixing operation with respect to another kind of wall using the supporting device to a display apparatus 10 according to an exemplary embodiment of the present general inventive concept, will be described.

FIG. 11A to 11D are sequential views illustrating an operation to mount the wire hanger, according to an exemplary embodiment of the present general inventive concept, to a wall.

Here, another kind of wall, e.g., a double wall, may include a general first wall A and a second wall B spaced forward from the first wall A.

First, as illustrated in FIG. 11A, a hole is formed in the second wall B by use of, e.g., a drill. Then, an anchor 68 suitable to support a weight of a display apparatus 10 may insert into the hole as illustrated in FIG. 11B, and the wire hanger 60 coupled with the separation protector 70 is positioned at the hole of the second wall B as illustrated in FIG. 11C. Then, as the screw 65 is fastened through the wire hanger 60, the anchor 68 is pushed to firmly come into close contact with an inner surface of the hole in the second wall B, providing a force sufficient to withstand the weight of the display apparatus 10. Thereafter, the cap 66 is fitted to the wire hanger 60, completing fixation of the wire hanger 60 with respect to the second wall B.

In the case of the above-described double wall, the anchor 68 inserted into the second wall B may be a toggle anchor, a distal end of which is unfolded once being inserted through the wall.

An alteration of the fixing unit provided in the supporting device to a display device 10 illustrated in FIG. 2, will now be described.

Figure 14:
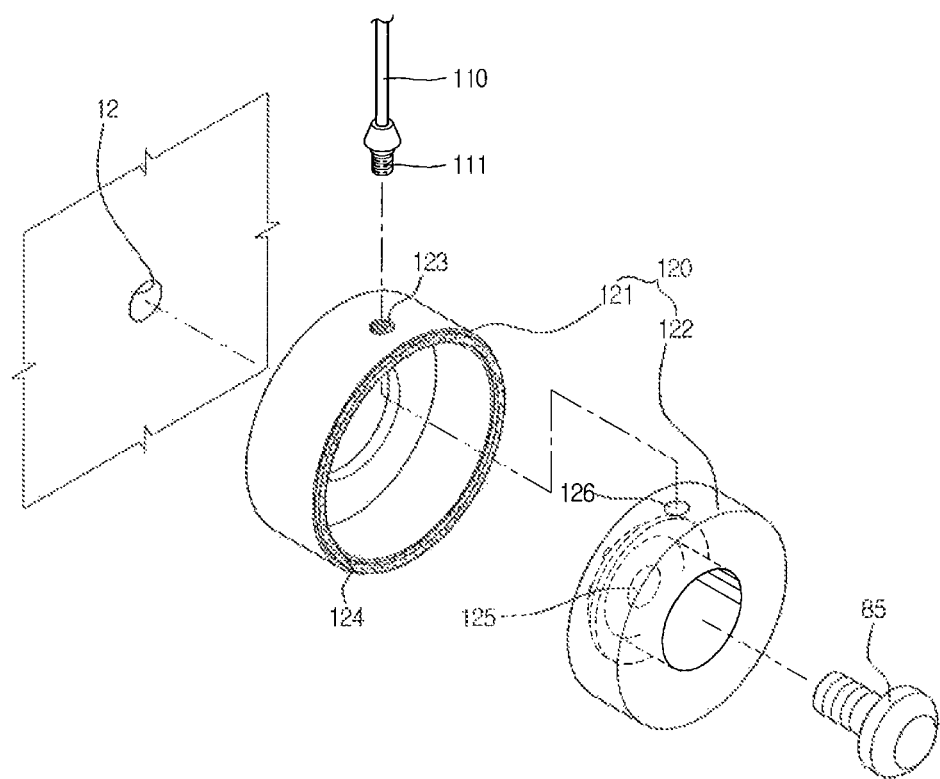
FIG. 14 is an assembly view illustrating an alteration of the fixing unit provided in the supporting device to a display apparatus illustrated in FIG. 2.

FIG. 14 is an assembly view illustrating an exemplary embodiment of the fixing unit provided in the supporting device to a display apparatus 10 illustrated in FIG. 2.

The exemplary embodiment of FIG. 14 differs only in the configuration of the fixing unit as compared to the above-described exemplary embodiment of FIG. 2 and other exemplary embodiments of the present general inventive concept, and other configurations of the exemplary embodiment may be equal to those of any one of the embodiments of the present general inventive concept.

A fixing unit 120 according to the exemplary embodiment, as illustrated in FIG. 14, may include a first case 121 defining an outer appearance of the fixing unit 120 and used for fixation of a wire part 110, and a second case 122 coupled into the first case 121 and configured to close a front side of the first case 121.

The first case 121 may be perforated in an outer periphery thereof with a wire insertion hole 123 to couple of an end of the wire part 110. Also, a first buffer member 124 is attached to a rear rim of the first case 121, to prevent damage and noise caused upon collision with the wall.

The wire insertion hole 123 may form with a female screw, and the wire part 110 is provided at the end thereof with a separation protector 111 to correspond to the wire insertion hole 123. Accordingly, as the separation protector 111 is fastened with the wire insertion hole 123, the wire part 110 may firmly fix to the fixing unit 120.

The separation protector 111 may take the form of a male screw corresponding to the wire insertion hole 123. The separation protector 111 is formed at the end of the metallic wire part 110 via, e.g., die-casting, and may have a diameter larger than a thickness of the wire part 110.

Accordingly, as both ends of the wire part 110 are screwed into the wire insertion holes 123 perforated in the first cases 121 of a pair of fixing units 120, the wire part 110 may firmly fix to the fixing units 120.

The second case 122 has a center screw hole 125 through which a fastening screw 85 may be inserted, and a peripheral receiving hole 126 in which a distal end of the separation protector 111 may be received.

Even if a great load is used with the wire part 110 when the display apparatus 10 is mounted to the wall thus causing the wire part 110 to be pulled with an excessive pulling force, the wire part 110 may withstand the great load due to the strong screw fastening between the wire part 110 and the fixing unit 120.

Another exemplary embodiment of the fixing unit provided in the supporting device to a display device illustrated in FIG. 2 will now be described.

Figure 15:
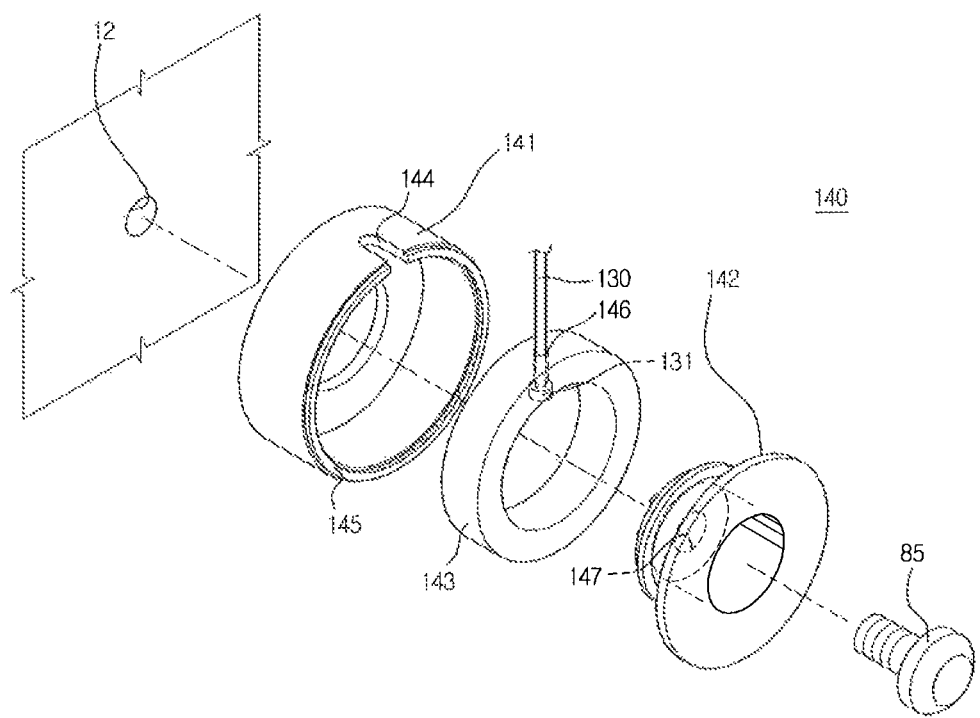
FIG. 15 is an assembly view illustrating an exemplary embodiment of the present general inventive concept of the fixing unit provided in the supporting device to a display apparatus illustrated in FIG. 2.

FIG. 15 is an assembly view illustrating an exemplary embodiment of the fixing unit provided in the supporting device to a display apparatus 10 illustrated in FIG. 2.

The present exemplary embodiment of the present general inventive concept of FIG. 15 differs only in the configuration of the fixing unit as compared to the above-described exemplary embodiment of FIG. 2 and other exemplary embodiments of the present general inventive concept, and other configurations of the exemplary embodiment may be equal to those of any one of the exemplary embodiments of the present general inventive concept.

A fixing unit 140 according to an exemplary embodiment of the present general inventive concept, as illustrated in FIG. 15, includes a first case 141 defining an outer appearance of the fixing unit 140 and used to fix a wire part 130, a second case 142 to couple into the first case 141 and configured to close a front side of the first case 141, and a fixing member 143 to couple with the wire part 130 and inserted in a space defined by the first and second cases 141 and 142.

The first case 141 is provided in an outer periphery thereof with a wire insertion hole 144, such that the wire part 130 may be received in the wire insertion hole 144. Also, a first buffer member 145 may attach to a rear rim of the first case 141, to prevent damage and noise caused upon collision with the wall.

The wire insertion hole 144 is cut from a rear end of the first case 141 to insert the wire part 130.

An end of the wire part 130 is fixed to the fixing member 143. The fixing member 143 is an annular metal member provided in an outer periphery thereof with a wire hole 146, through which the end of the wire part 130 is inserted.

After the wire part 130 is inserted through the wire hole 146 from the outer periphery to the inner periphery of the fixing member 143, a separation protector 131 is formed at the end of the wire part 130, to prevent the wire part 130 from being separated from the fixing member 143.

The separation protector 131 may form at the end of the metallic wire part 130 via, e.g., die-casting, and may have a diameter larger than a diameter of the wire hole 146.

The second case 142 has a center screw hole 147, through which the fastening screw 85 may be inserted.

With the above-described configuration, first, the fixing member 143 coupled with the wire part 130 is seated in the first case 141 such that an appropriate portion of the wire part 130 is inserted into the wire insertion hole 144 of the first case 141. Thereafter, as the second case 142 is coupled with the first case 141 and the fastening screw 85 is screwed through the second case 142, the fixing unit 140 is coupled to the rear surface 11 of the display apparatus 10.

The separation protector 131 may firmly form at the wire part 130 and may prevent the wire part 130 from being separated from the fixing member 143 even if a great load is usable with the wire part 130. Also, since the fixing member 143 is fixed to the rear surface 11 of the display apparatus 10 by means of the fastening screw 85 while being received in the space defined by the first and second cases 141 and 142, it may be possible to prevent the fixing member 143 from being separated from the first and second cases 141 and 142 despite the great load usable with the wire part 130.

The exemplary embodiment of the present general inventive concept illustrated in FIG. 2 and the alterations illustrated in FIGS. 14 and 15 describe configurations to firmly fix the wire part to the rear surface of the display apparatus. Of course, other configurations to firmly fix the wire part to the rear surface of the display apparatus may be possible.

A supporting device to a display apparatus according to an exemplary embodiment of the present general inventive concept, will now be described.

Other configurations, except for the separation protector, may be equal to those of the previously described exemplary embodiment.

The same elements as those of the previously described exemplary embodiment of the present general inventive concept are designated by the same reference numerals, and a description thereof will be omitted. The following description is based only on configurations different from the previously described exemplary embodiment.

Figure 8:
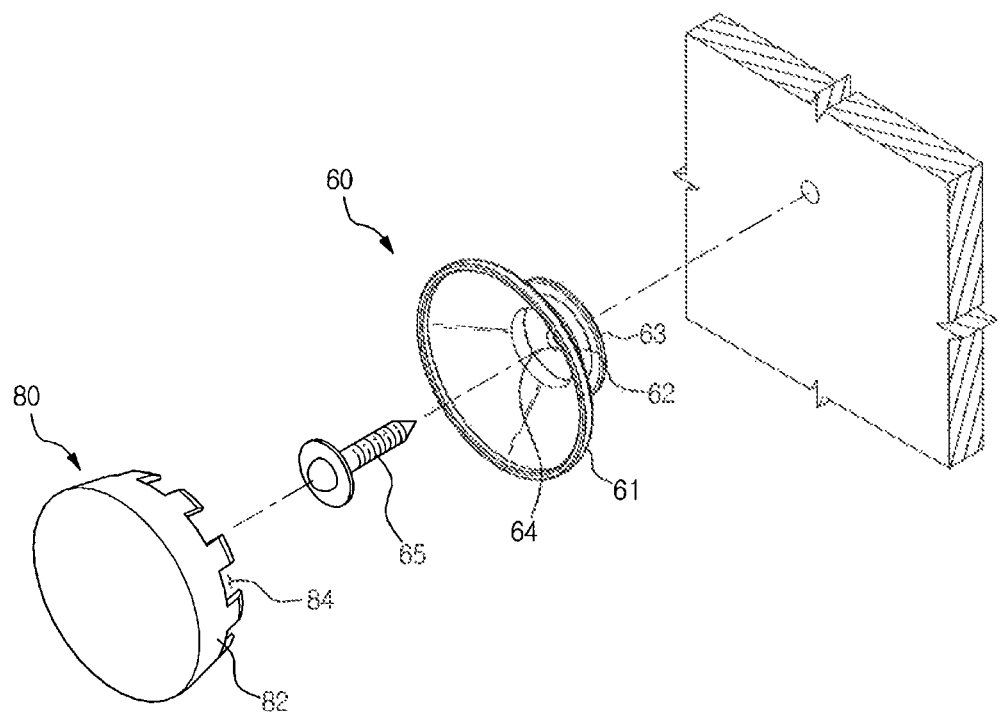
FIG. 8 is an exploded perspective view of a wire hanger and a separation protector according to an exemplary embodiment of the present general inventive concept.
Figure 9:
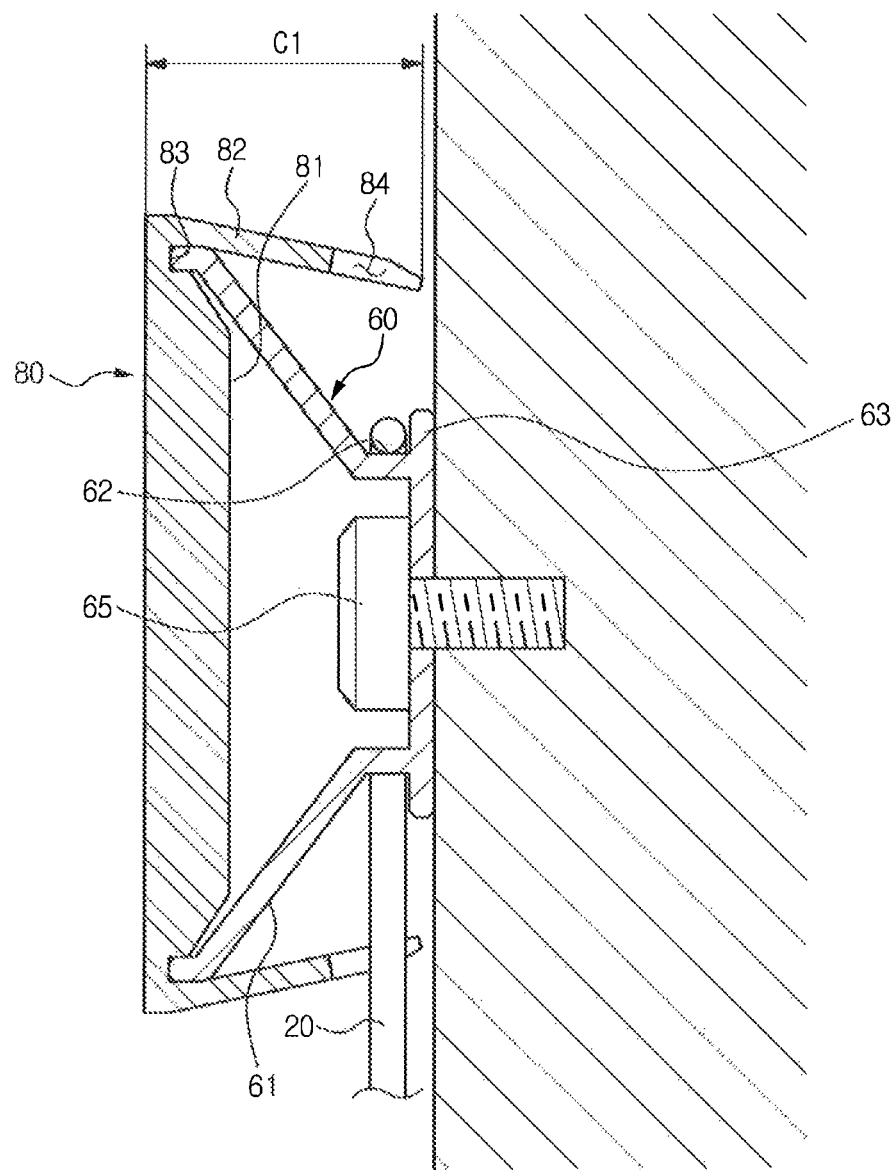
FIG. 9 is a partial sectional view illustrating a coupled state of the wire hanger and separation protector according to the embodiment of FIG. 8.

FIG. 8 is an exploded perspective view of a wire hanger and a separation protector according to an exemplary embodiment of the present general inventive concept, and FIG. 9 is a partial sectional view illustrating a coupled state of the wire hanger and separation protector according to an exemplary embodiment of FIG. 8.

A separation protector 80 included in the supporting device to a display apparatus according to the present exemplary embodiment of the present general inventive concept, as illustrated in FIGS. 8 and 9, may be configured not only to close a front side of the head portion 61 of the wire hanger 60, but also to prevent separation of the wire part 20.

The separation protector 80 may be made of an elastic material, and includes a front cap portion 81 to close the interior of the head portion 61 and a separation protecting portion 82 protruding from a rim of the cap portion 81 to prevent separation of the wire part 20.

A coupling recess 83 is defined between the cap portion 81 and the separation protecting portion 82 to couple with the rim of the head portion 61. As the rim of the head portion 61 is inserted into the coupling recess 83, the separation protector 80 may be firmly mounted to the head portion 61.

The separation protecting portion 82 is formed with wire receiving indentations 84 to correspond to the wire part 20. After the wire receiving indentations 84 are positioned to correspond to the wire part 20 in a state wherein the wire part 20 is hung on the wire hanger 60, the wire part 20 may be mounted onto the head portion 61 so as to be completely coupled thereto.

Additionally, C1 illustrates the distance the separation protection portion 82 extends towards the wall when separation protector 80 is assembled on the wire hanger 60 where the wire hanger 60 is fastened to the wall.

Note the separation protector, according to an exemplary embodiment of the present general inventive concept, may exhibit the same effects as those of the previously described exemplary embodiment.

A supporting device to a display apparatus, according to an exemplary embodiment of the present general inventive concept, will now be described.

Other configurations, except for the wire part, wire hanger and separation protector, may be equal to those of the previously described exemplary embodiments of the present general inventive concept.

Figure 12:
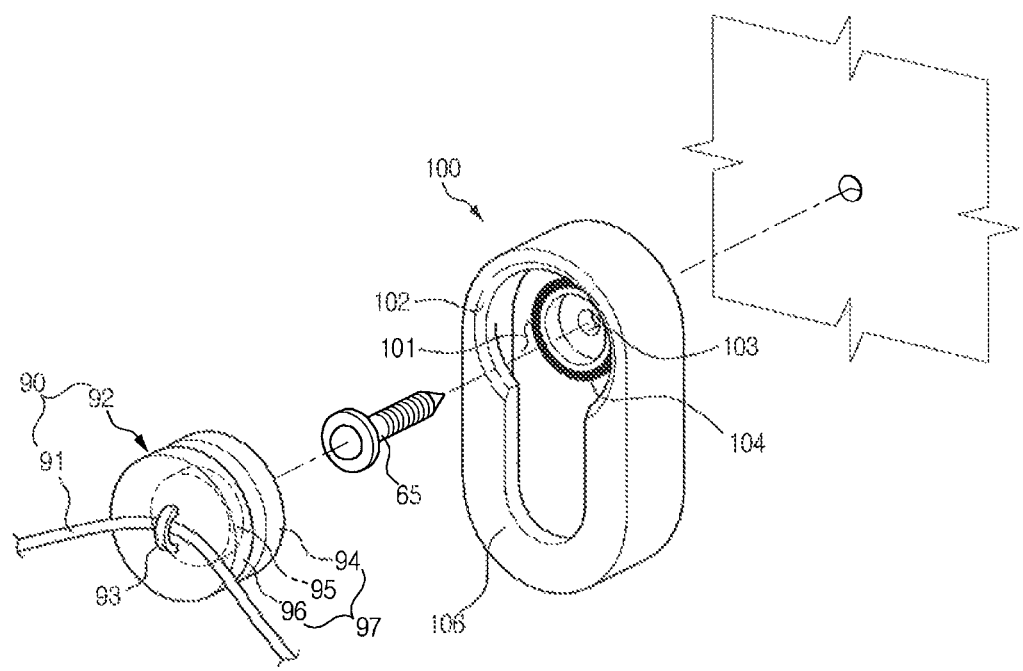
FIG. 12 is an exploded perspective view illustrating important parts of a supporting device to a display apparatus according to an exemplary embodiment of the present general inventive concept.
Figure 13:
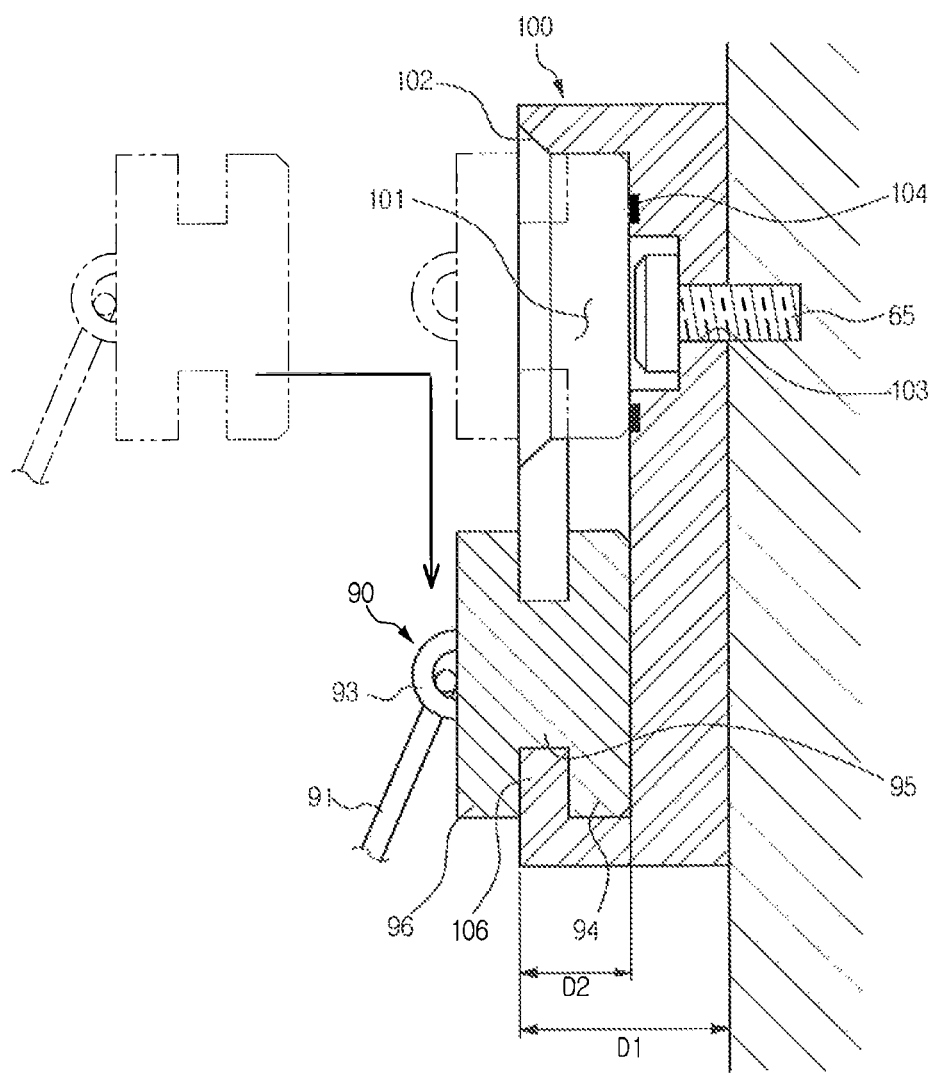
FIG. 13 is a view illustrating an operation to mount a display apparatus to a wall by use of the supporting device according to an exemplary embodiment of the present general inventive concept.

FIG. 12 is an exploded perspective view illustrating important parts of a supporting device to a display apparatus according to an exemplary embodiment of the present general inventive concept, and FIG. 13 is a view illustrating an operation to mount a display apparatus to a wall by use of the supporting device according to an exemplary embodiment of FIG. 12.

The supporting device to a display apparatus according to the present exemplary embodiment of the present general inventive concept, as illustrated in FIG. 12, includes a wire part 90 having a coupling piece 92 integrally provided at an arbitrary position thereof, a wire hanger 100 using the wire part 90 coupled with the display apparatus 10 to mount to the wall, and a separation protector 106 to prevent the wire part 90 from being separated from the wire hanger 100.

The wire part 90 serves to connect the display apparatus 10 to the wire hanger 100. The wire part 90 includes a wire 91 made of, e.g., a metal material, to withstand a weight of the display apparatus 10 and the coupling piece 92 provided at an arbitrary position of the wire 91 and to serve to couple the wire 91 to the wire hanger 100.

The coupling piece 92 includes a loop 93 to insert wire 91, and a body 97 to be coupled into the wire hanger 100.

The loop 93 may be larger than a diameter of wire 91, thus allowing the coupling piece 92 to move along the wire 91.

The body 97, 94, 95 and 96 may have a cylindrical shape, and includes a pair of first and second large-diameter portions 94 and 96. A small-diameter portion 95 provided between the pair of first and second large-diameter portions 94 and 96 may have a diameter smaller than that of the first and second large-diameter portions 94 and 96.

The body 97 and loop 93 may be integrally formed with each other by use of a highly rigid metal material.

The wire hanger 100 is internally defined with an insertion recess 101 to correspond to the coupling piece 92 and may be longitudinally provided with the separation protector 106 below the insertion recess 101.

The insertion recess 101 may centrally form with a screw hole 103 through which the screw 65 penetrates to mount the wire hanger 100 to the wall.

At least one of a rim of the insertion recess 101 and the first large-diameter portion 94 of the coupling piece 92 may be provided with a tapered portion 102, to guide smooth insertion of the coupling piece 92 into the insertion recess 101. In the present exemplary embodiment of the present general inventive concept, for example, the insertion recess 101 may be provided with the tapered portion 102.

Accordingly, as illustrated in FIG. 13, if the first large-diameter portion 94 of the coupling piece 92 is inserted into the insertion recess 101 and is moved downward, the small-diameter portion 95 between the first and second large-diameter portions 94 and 96 may engage with the separation protector 106, thus allowing the first large-diameter portion 94 of the coupling piece 92 to be supported by a rear surface of the separation protector 106 and prevent the coupling piece 92 from separating from the wire hanger 100.

Thereby, it may be possible to prevent the wire 91 connected with the coupling piece 92 from separating from the wire hanger 100.

At least one of the coupling piece 92 and the wire hanger 100 may be provided with a permanent magnet 104, and the remaining one may be made of a metal material.

The permanent magnet 104 may be provided at a front surface of the first large diameter portion 94 of the coupling piece 92, or may be provided in the insertion recess 101 of the wire hanger 100. In the present exemplary embodiment of the present general inventive concept, for example, the permanent magnet 104 is provided in the insertion recess 101 of the wire hanger 100.

With the above-described arrangement, even if an operator fails to assure a sufficient viewing range and thus, to accurately position the coupling piece 92 in the wire hanger 100, the coupling piece 92 is inserted into the insertion recess 101 by a magnetic force of the permanent magnet 104 so long as the coupling piece 92 is located close to the insertion recess 101 of the wire hanger 100.

Further, D1 illustrates the width of the wire hanger 100 while D2 illustrates the depth in which the wire part 90 may insert into the insertion recess 101.

Then, although the wire 91 connected with the display apparatus 10 may be moved in response to the display apparatus 10, for example via an operation to horizontally balance the display apparatus 10, the longitudinally elongated separation protector 106 keeps the first large-diameter portion 94 caught by the insertion recess 101, thus preventing separation of the coupling piece 92. When the coupling piece 92 is moved toward the insertion recess 101, the coupling piece 92 may continuously comes into contact with the insertion recess 101 by a magnetic force of the permanent magnet 104, thus preventing the wire 91 from separating from the wire hanger 100.

The configurations of the coupling piece 92 and wire hanger 100 are not limited to the present exemplary embodiment of the present general inventive concept. For example, a coupling piece having no second large-diameter portion may exhibit the same function, and the insertion recess of the wire hanger may be larger than that illustrated in FIG. 12 to allow the coupling piece to be more easily guided thereinto.

Figure 10:
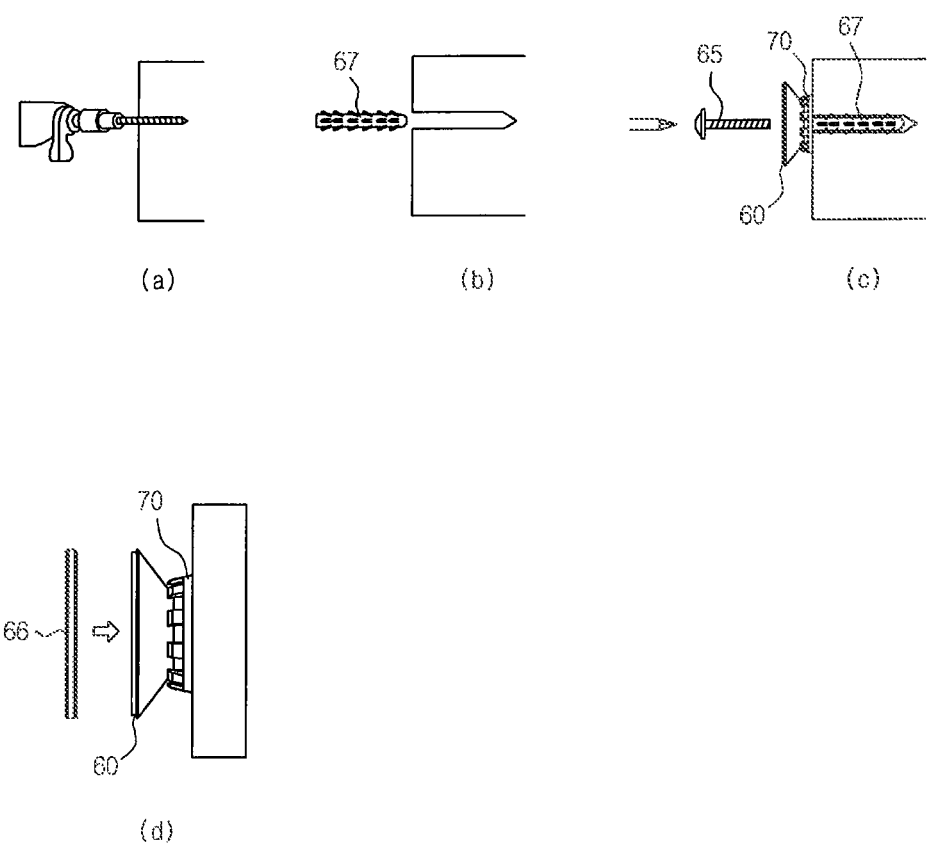
FIGS. 10A to 10D are sequential views illustrating an operation to mount the wire hanger, according to an exemplary embodiment of the present general inventive concept, to a wall.
Figure 11:
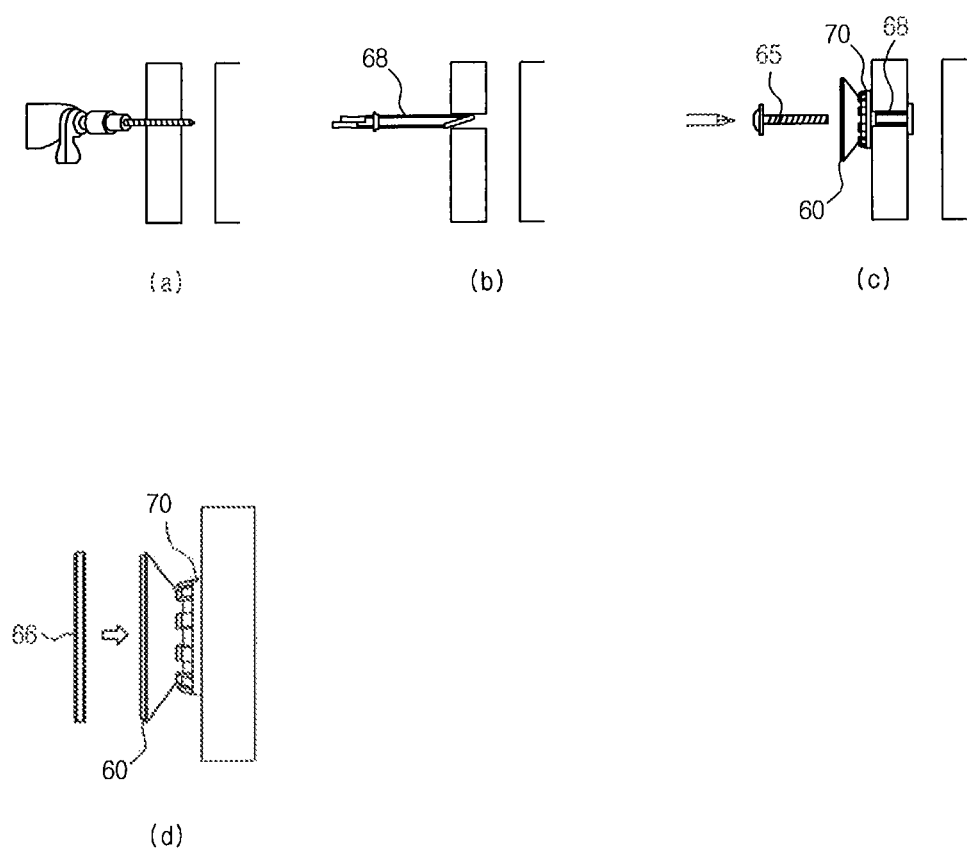
FIGS. 11A to 11D are sequential views illustrating an operation to mount the wire hanger according to an exemplary embodiment of the present general inventive concept, to a wall.

Although not illustrated in the drawings, the latter two exemplary embodiments of the present general inventive concept may allow the wire hanger to be fixed to the wall in the same manner as illustrated in FIGS. 10 and 11 related to the previously described exemplary embodiment.

Figure 16:
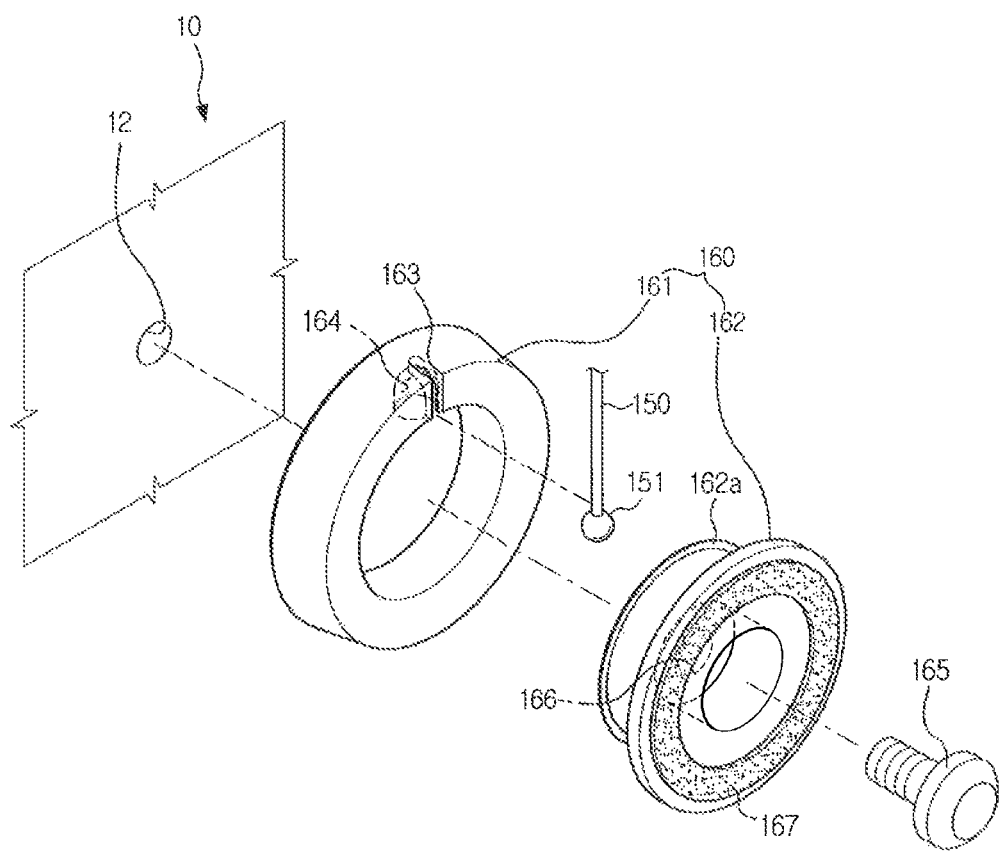
FIG. 16 is an exploded perspective view illustrating an exemplary embodiment of the present general inventive concept of the fixing unit provided in a supporting device to a display apparatus illustrated in FIG. 2.
Figure 17:
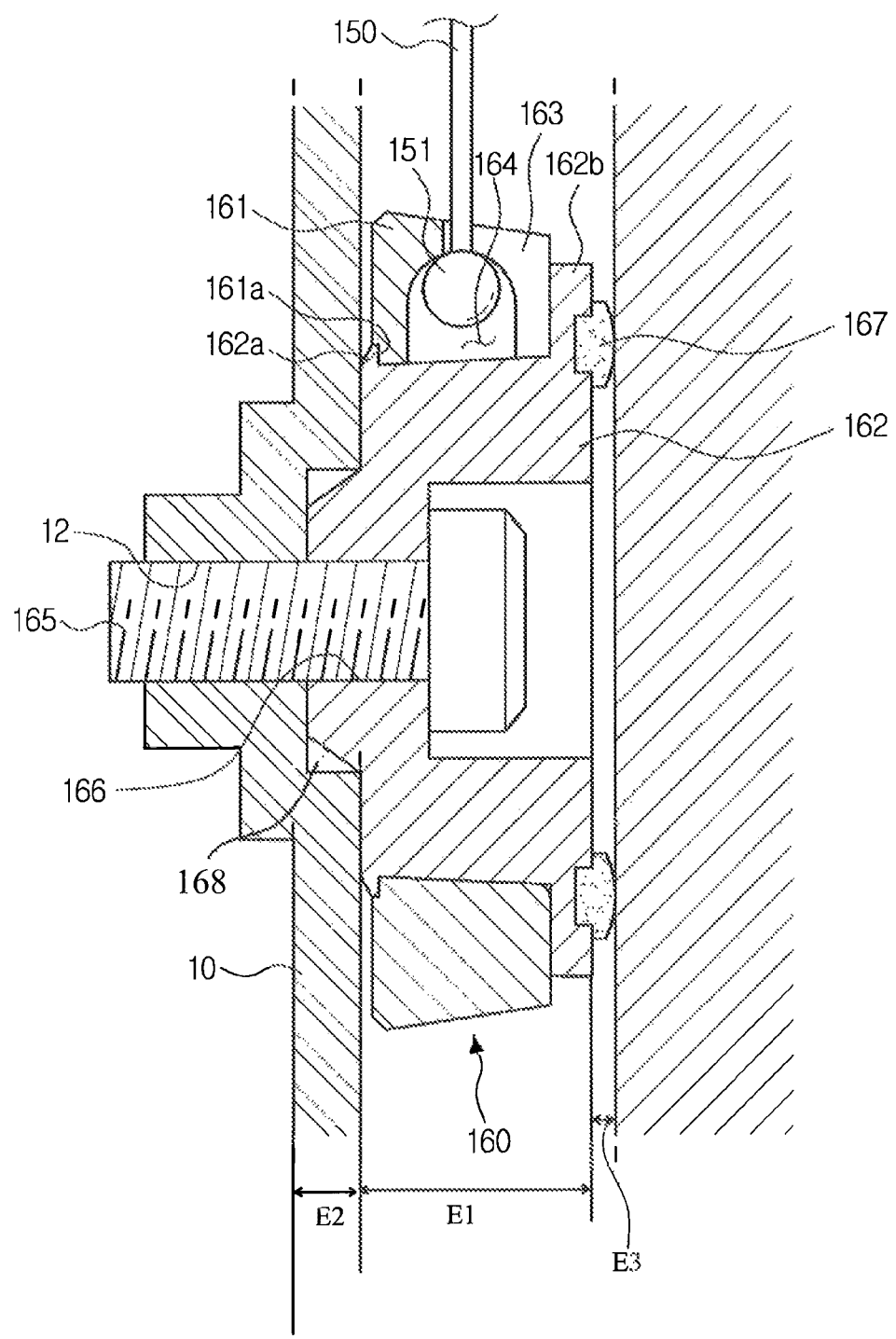
FIG. 17 is a view illustrating a coupled state of the fixing unit corresponding to FIG. 16.

FIG. 16 is an exploded perspective view illustrating an exemplary embodiment of the present general inventive concept of the fixing unit provided in a supporting device to a display apparatus illustrated in FIG. 2, and FIG. 17 is a view illustrating a coupled state of the fixing unit corresponding to FIG. 16.

The exemplary embodiment of FIGS. 16 and 17 differs only in the configuration of the fixing unit as compared to the above-described exemplary embodiment illustrated in FIG. 2 and other exemplary embodiments of the present general inventive concept, and other configurations of the exemplary embodiment may be equal to those of any one of the embodiments of the present general inventive concept.

A fixing unit 160 according to the present exemplary embodiment, as illustrated in FIGS. 16 and 17, may include a first case 161 and a second case 162 coupled to the first case 161.

The first case 161 and the second case 162 may be configured so as to be coupled to or separated from each other via hook coupling. When the second case 162 is inserted into the first case 161, a second stepped portion 162a of the second case 162 may be interference fitted into the a first stepped portion 161a of the first case 161. In this case, a cover 162b of the second case 162 may cover an entire surface of the first case 161.

The first case 161 may include a wire insertion hole 163 to receive a wire part 150. The wire insertion hole 163 may be cut, by a predetermined length, in any one position of an outer rim of the first case 161. In addition, the first case 161 may include a ball seat 164 to receive a ball 151 of the wire part 150. The ball seat 164 may be indented, by a predetermined depth, from any one position of an inner peripheral surface of the first case 161. Here, the position of the ball seat 164 is determined to correspond to the wire insertion hole 163.

The wire part 150 may be provided at an end thereof with the ball 151. The ball 151 may be formed via, e.g., die-casting, and may have a diameter larger than that of the wire insertion hole 163. In this case, the wire part 150 may have a diameter smaller than that of the wire insertion hole 163. As the wire part 150 is inserted into the wire insertion hole 163 and the ball 151 of the wire part 150 is seated and supported in the ball seat 164 of the first case 161, it may be possible to prevent the wire part 150 from separating from the first case 161. In addition, once the first case 161 and the second case 162 are coupled to each other via hook coupling, the cover 162b of the second case 162 closes the wire insertion hole 163 of the first case 161. This may prevent the wire part 150 from separating from the first case 161 and the second case 162.

The second case 162 may include a center screw hole 166. As a fastening screw 165 penetrates through the screw hole 166 and is coupled to the rear surface of the display apparatus 10, the fixing unit 160 may be fixed to the rear surface of the display apparatus 10.

The second case 162 may include a buffer member 167. The buffer member 167 may be supported on the wall and serve to dampen shock caused when the display apparatus 10 is mounted to the wall.

With the above described configuration, after a portion of the wire part 150 is inserted into the wire insertion hole 163 and the ball 151 of the wire part 150 is seated in the ball seat 164 of the first case 161, the second case 162 is coupled to the first case 161 so as to close the wire insertion hole 163. Thereafter, the fixing unit 160 may be coupled to the rear surface of the display apparatus 10 by use of the fastening screw 165.

The ball 151 firmly forms at the wire part 150 and thus, it may be possible to prevent the wire part 150 from separating from the first case 161 even if a great load is used with the display apparatus 10.

In addition, E1 illustrates a distance the fixing unit 160 extends toward the wall when the fixing unit 160 is assembled to the display apparatus 10, while E2 illustrates a depth to which the fixing unit 160 may be inserted into a receiving portion 168 on the surface of the display apparatus 10. E3 illustrates a distance between the rear portion of the second case 162 and the wall when the buffer member 167 is in contact with the wall.

Figure 18:
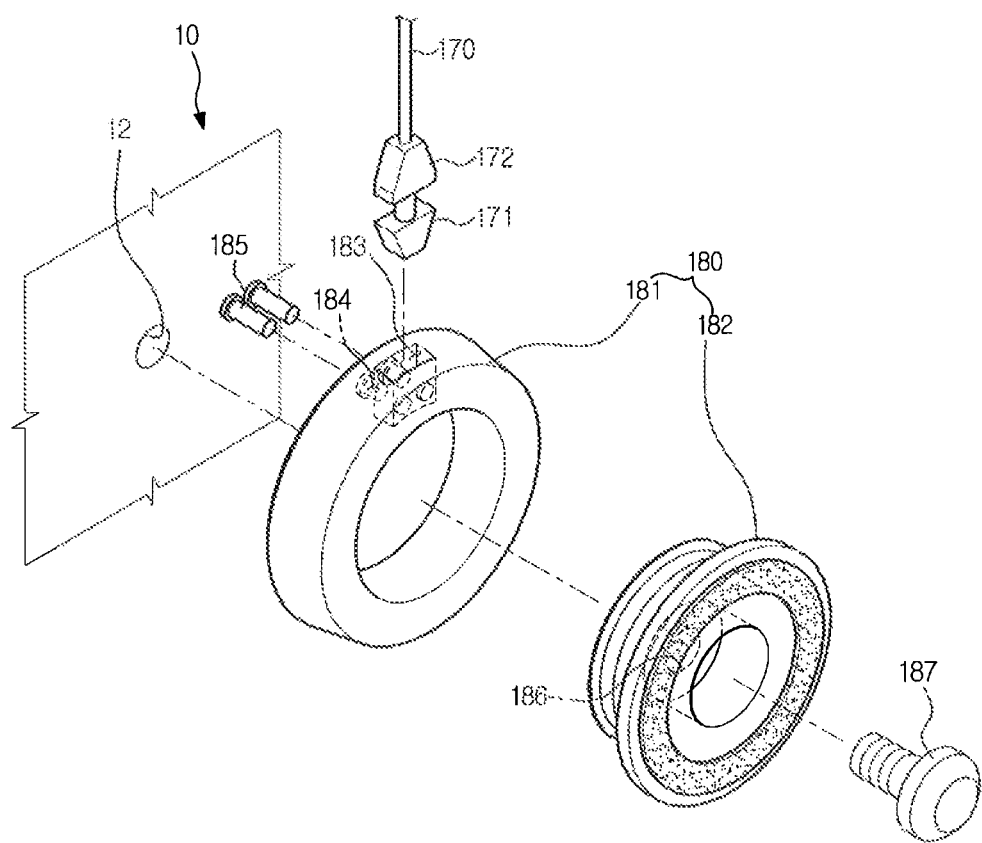
FIG. 18 is an exploded perspective view illustrating an exemplary embodiment of the present general inventive concept of the fixing unit provided in a supporting device to a display apparatus illustrated in FIG. 2.
Figure 19:
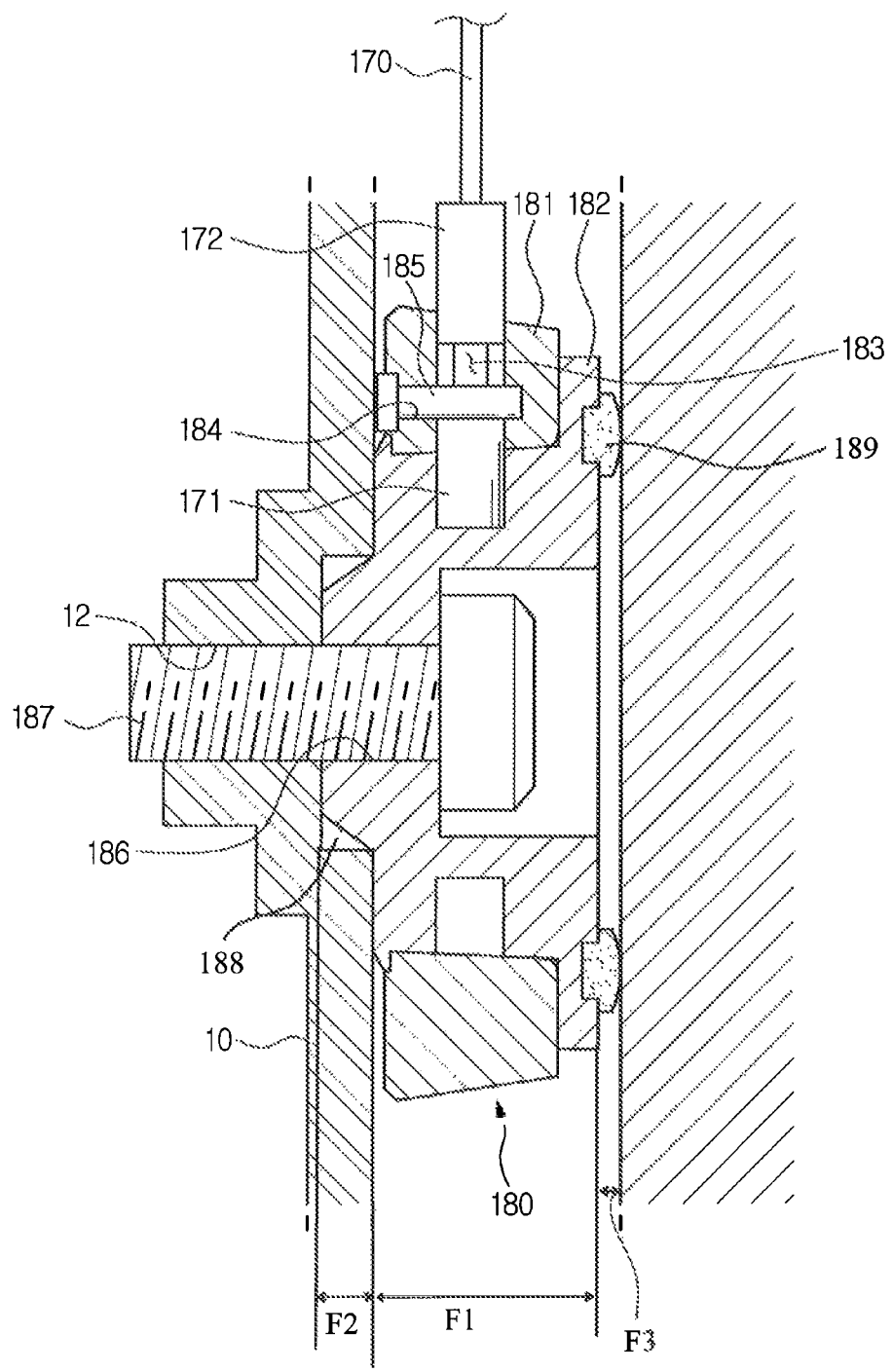
FIG. 19 is a view illustrating a coupled state of the fixing unit corresponding to FIG. 18.

FIG. 18 is an exploded perspective view illustrating an exemplary embodiment of the present general inventive concept of the fixing unit provided in a supporting device to a display apparatus illustrated in FIG. 2, and FIG. 19 is a view illustrating a coupled state of the fixing unit corresponding to FIG. 18.

The exemplary embodiment of FIGS. 18 and 19 differs only in the configuration of the fixing unit as compared to the above-described exemplary embodiment illustrated in FIG. 2 and other exemplary embodiments of the present general inventive concept, and other configurations of the exemplary embodiment may be equal to those of any one of the embodiments of the present general inventive concept.

A fixing unit 180 according to the present exemplary embodiment, as illustrated in FIG. 18, may include a first case 181 and a second case 182 coupled to the first case 181. Here, the first case 181 and the second case 182 may be integrated to form a single unit.

The second case 182 may have an annular shape, and a screw hole 186 may be perforated in a center portion of the second case 182. As a fastening screw 187 penetrates through the screw hole 186 and is coupled to the rear surface of the display apparatus 10, the fixing unit 180 may be fixed to the rear surface of the display apparatus 10.

A wire part 170 may include one or more separation protectors 171 and 172. The separation protectors 171 and 172 may include a first separation protector 171 formed at an end of the wire part 170, and a second separation protector 172 formed at a position of the wire part 170 spaced apart from the first separation protector 171. Here, the first separation protector 171 and the second separation protector 172 may be formed at the metallic wire part 170 by, e.g., die-casting.

The fixing unit 180 may further include an anti-separation recess 183 indented inward from an outer peripheral surface of the first case 181, a pin insertion recess 184 indented inward from an outer surface of the first case 181 in a direction approximately parallel to the indentation of the anti-separation recess 183 to penetrate through the anti-separation recess 183, and an anti-separation pin 185 to couple to the pin insertion recess 184. When the first separation protector 171 and the second separation protector 172 are inserted into the anti-separation recess 183 and the anti-separation pin 185 is inserted into the pin insertion recess 184, the anti-separation pin 185 may be located between the first separation protector 171 and the second separation protector 172. In this case, the anti-separation pin 185 acts to intercept an escape of the first separation protector 171, whereby it may be possible to prevent the wire part 170 from separating from the fixing unit 180.

With the above described configuration, after the separation protectors 171 and 172 of the wire part 170 are inserted into the anti-separation recess 183 and the anti-separation pin 185 is inserted into the pin insertion recess 184, the fixing unit 180 may be coupled to the rear surface of the display apparatus 10 by use of a fastening screw 187.

The separation protectors 171 and 172 firmly form at the wire part 170 and thus, it may be possible to prevent the wire part 170 from separating from the first case 181 even if a great load is usable with the display apparatus 10.

In addition, F1 illustrates a distance the fixing unit 180 extends toward the wall when the fixing unit 180 is assembled to the display apparatus 10, while F2 illustrates a depth to which the fixing unit 160 may be inserted into a receiving portion 188 on the surface of the display apparatus 10. F3 illustrates a distance between the rear portion of the second case 162 and the wall when the buffer member 189 is in contact with the wall.

Although the exemplary embodiments of FIG. 2 and FIGS. 14 to 19 disclose configurations to firmly fix the wire part to the rear surface of the display apparatus, of course, other configurations to firmly fix the wire part to the rear surface of the display apparatus may be possible.

In particular, the exemplary embodiments of FIGS. 14 to 19 disclose configurations in which the length of the wire part of the supporting device to a display apparatus may be adjusted. Specifically, in the exemplary embodiments of FIGS. 14 to 19, the wire part, which has been previously coupled to the fixing unit, may be separated from the fixing unit and thereafter, a new wire part may be coupled to the fixing unit.

Figure 20:
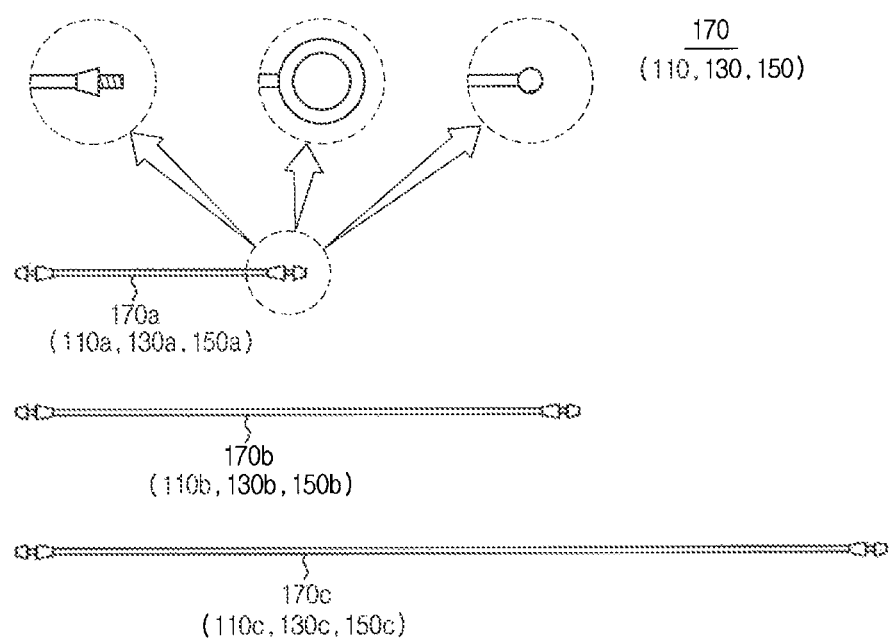
FIG. 20 is a view illustrating an arrangement of a plurality of wire parts according to an exemplary embodiment of the present general inventive concept.

FIG. 20 is a view illustrating an arrangement of a plurality of wire parts according to an exemplary embodiment of the present general inventive concept.

As illustrated in FIG. 20, a plurality of wire parts 170 may be provided. The plurality of wire parts 170 may include a first wire part 170a, a second wire part 170b, and a third wire part 170c, which may have different lengths. As described above with reference to FIG. 2, since the sum of the distances G and H between each of the upper holes 12 and the above described point is changed according to variation in the size of the display apparatus 10, it may be necessary to change the length of the wire part 20. Accordingly, after any one wire part having an appropriate length (e.g., the first wire part 170a) is selected from among the plurality of wire parts 170 according to the size of the display apparatus 10, the first wire part 170a may be coupled to the display apparatus 10 by use of the fixing unit 180.

In addition, the fixing unit 180 may be coupled to another one of the plurality of wire parts 170 (e.g., the second wire part 170b). For this, after separating the first wire part 170a from the fixing unit 180, the second wire part 170b may be coupled to the fixing unit 180.

As described above, any one wire part, which is selected from the plurality of wire parts 170 according to the size of the display apparatus 10, may be coupled to the fixing unit 180, and one wire part to couple to the fixing unit 180 may be freely replaced with another wire part.

For this, each of the plurality of wire parts 170 may be configured to be easily coupled to or separated from the fixing unit 180.

The arrangement of the plurality of wire parts 170 may be applied to the exemplary embodiments of FIGS. 14 to 19. More specifically, referring to FIG. 14, each of a plurality of wire parts 110 may be coupled to or separated from the fixing unit 120 via screw fastening. The separation protector 111 of the wire part 110 may take the form of a male screw, and the wire insertion hole 123 of the fixing unit 120 may take the form of a female screw. After selecting any one of the plurality of wire parts 110 according to the size of the display apparatus 10, the selected one of the plurality of wire parts 110 may be fixed to the display apparatus 10 by use of the fixing unit 120. In this case, one wire part to couple to the fixing unit 120 may be freely replaced with another wire part.

Referring to FIG. 15, each of a plurality of wire parts 130 may be coupled to or separated from the fixing unit 140. Once the first case 141 and the second case 142 are coupled to each other, the fixing member 143 is caught by the first case 141 and the second case 142, allowing the wire part 130 to be coupled to the fixing unit 140. Then, when the first case 141 and the second case 142 are separated from each other, the fixing member 143 is released from the first case 141 and the second case 142, allowing the wire part 130 to be separated from the fixing unit 140. After selecting any one of the plurality of wire parts 130 according to the size of the display apparatus 10, the selected one of the plurality of wire parts 130 may be fixed to the display apparatus 10 by use of the fixing unit 140, and one wire part to couple to the fixing unit 140 may be freely replaced with another wire part.

Referring to FIG. 16, each of a plurality of wire parts 150 may be coupled to or separated from the fixing unit 160. The first case 161 and the second case 162 may be coupled to each other via hook coupling, and thus may be coupled to or separated from each other via interference-fit. Once the first case 161 and the second case 162 are coupled to each other, the ball 151 of the wire part 150 is caught by the ball seat 164 of the first case 161, preventing the wire part 150 from separating from the fixing unit 160. Then, when the first case 161 and the second case 162 are separated from each other, the ball 151 of the wire part 150 is separated from the ball seat 164 of the first case 161, allowing the wire part 150 to be separated from the fixing unit 160. After selecting any one of the plurality of wire parts 150 according to the size of the display apparatus 10, the selected one of the plurality of wire parts 150 may be fixed to the display apparatus 10 by use of the fixing unit 160, and one wire part to couple to the fixing unit 160 may be freely replaced with another wire part.

Referring to FIG. 18, each of a plurality of wire parts 170 may be coupled to or separated from the fixing unit 180 via pin fastening, Once the separation protectors 171 and 172 of the wire part 170 are inserted into the anti-separation recess 183 of the fixing unit 180 and the anti-separation pin 185 is inserted into the pin insertion recess 184, each of the plurality of wire parts 170 may be kept coupled to the fixing unit 180. When the anti-separation pin 185 is released from the pin insertion recess 184, the separation protectors 171 and 172 of the wire part 170 may be separated from the anti-separation recess 183 of the fixing unit 180. After selecting any one of the plurality of wire parts 170 according to the size of the display apparatus 10, the selected one of the plurality of wire parts 170 may be fixed to the display apparatus 10 by use of the fixing unit 180, and one wire part to couple to the fixing unit 180 may be freely replaced with another wire part.

With the above described configuration, the length of the wire part 170 may be adjusted according to the size of the display apparatus 10 at the installation stage of the display apparatus 10.

Figure 21:
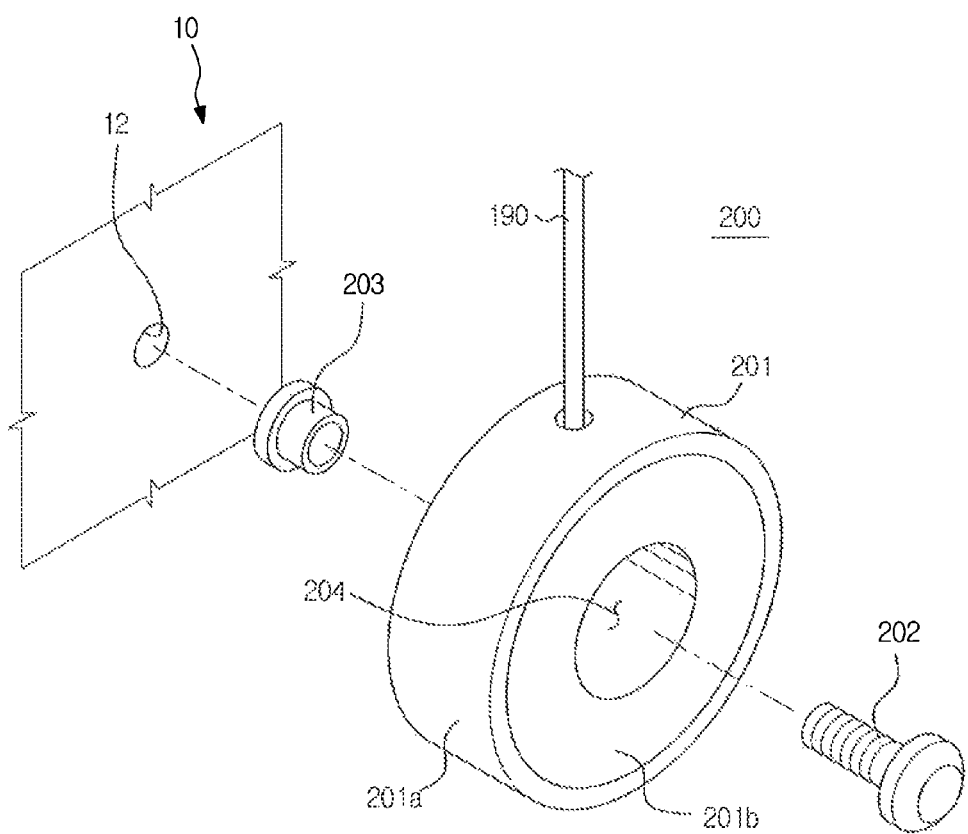
FIG. 21 is an exploded perspective view illustrating an exemplary embodiment of the present general inventive concept of the fixing unit provided in a supporting device to a display apparatus illustrated in FIG. 2.
Figure 22:
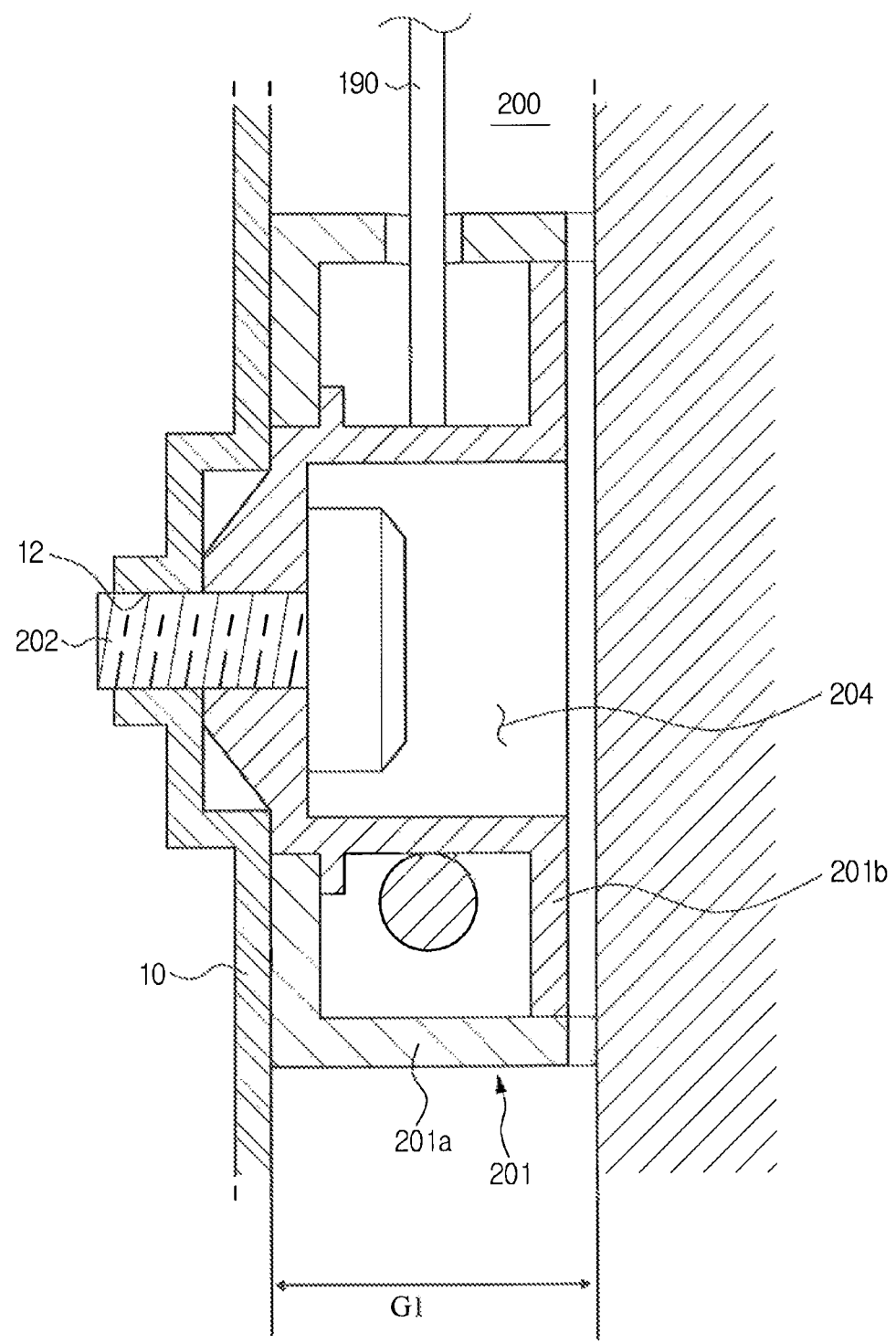
FIGS. 22 and 23 are views illustrating a coupled state of the fixing unit corresponding to FIG. 21.
Figure 23:
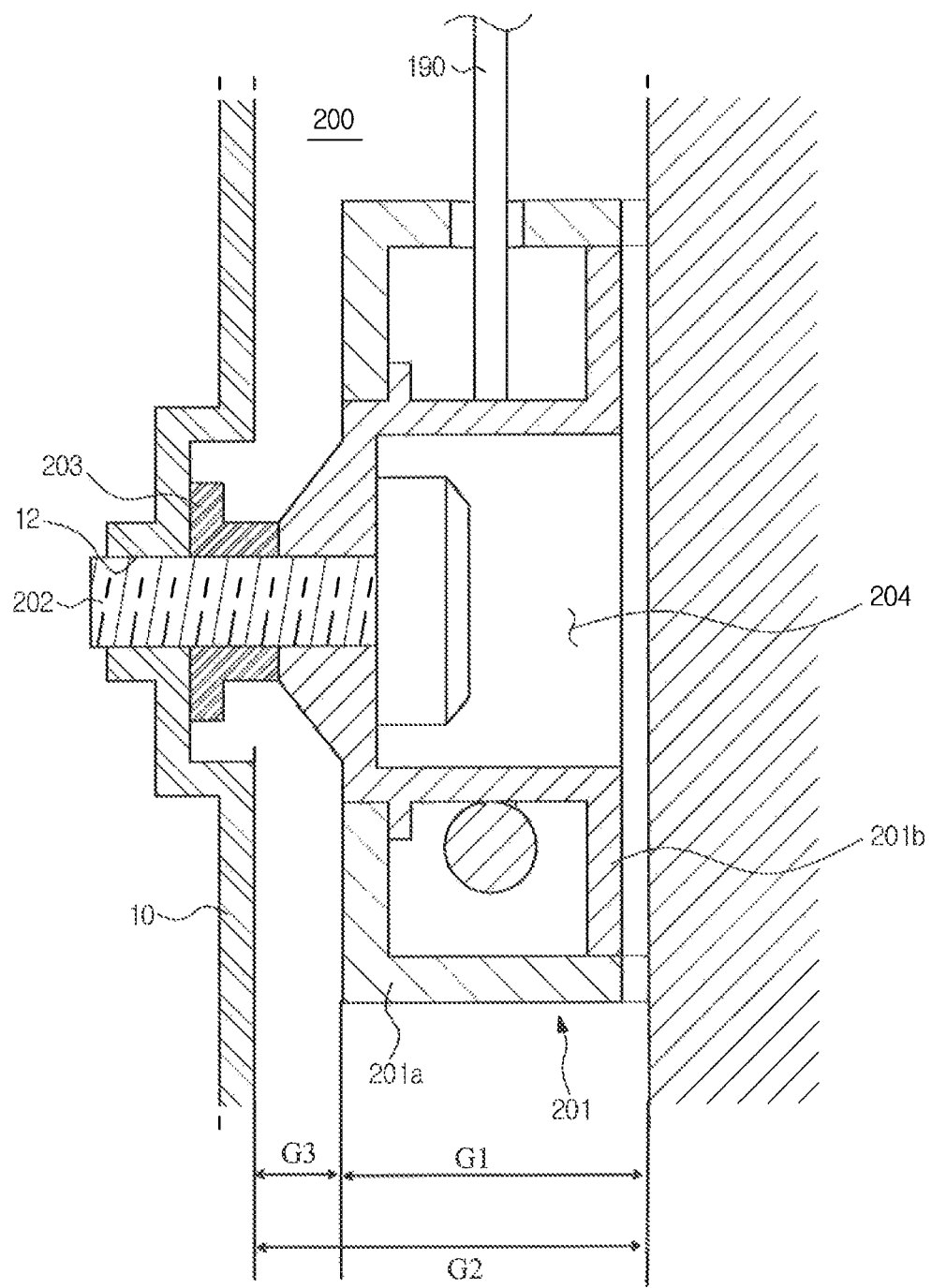

FIG. 21 is an exploded perspective view illustrating an exemplary embodiment of the present general inventive concept of the fixing unit provided in a supporting device to a display apparatus illustrated in FIG. 2, and FIGS. 22 and 23 are views illustrating a coupled state of the fixing unit corresponding to FIG. 21. More specifically, FIG. 22 illustrates the case of not using a height adjusting member, whereas FIG. 23 illustrates the case of using the height adjusting member.

The exemplary embodiment of FIG. 21 differs only in the configuration of the fixing unit as compared to the above-described exemplary embodiment of FIG. 2 and other exemplary embodiments of the present general inventive concept, and other configurations of the exemplary embodiment may be equal to those of any one of the embodiments of the present general inventive concept.

A fixing unit 200 according to the present exemplary embodiment, as illustrated in FIGS. 21 to 23, may include a case 201, a fastening member 202, and a height adjusting member 203.

The case 201 may include a first case 201a and a second case 201b. The first case 201a and the second case 201b may be integrated to form a single unit.

A wire part 190 may be coupled to the case 201. The case 201 and the wire part 190 may be coupled to each other via a coupling configuration selected from those illustrated in FIGS. 2, 14, 15, 16 and 18, whereby it may be possible to prevent the wire part 190 from separating from the case 201.

The case 201 may be located between the display apparatus 10 and the wall and may be fixed to the rear surface of the display apparatus 10. The case 201 may have a center fastening hole 204, such as a screw hole, etc. As the fastening member 202, such as a fastening screw, etc., is inserted into the fastening hole 204, the case 201 may be fixed to the rear surface of the display apparatus 10.

The fixing unit 200 may be configured to enable adjustment in a distance between the wall and the rear surface of the display apparatus 10.

As illustrated in FIG. 22, in a state wherein the case 201 is fixed to the rear surface of the display apparatus 10 and is supported on the wall, the rear surface of the display apparatus 10 may be spaced apart from the wall by a distance equal to a height (or thickness) of the case 201, indicated as G1.

As illustrated in FIG. 23, the height adjusting member 203 may be interposed between the case 201 and the display device 10. The case 201 and the height adjusting member 203 may be integrated to form a single unit. In a state wherein the case 201 and the height adjusting member 203 of the single unit are fixed to the rear surface of the display apparatus 10 and are supported on the wall, the rear surface of the display apparatus 10 may be spaced apart from the wall by a distance equal to a height (or thickness) of the unit consisting of the case 201 and height adjusting member 203, indicated as G2, such that the rear surface of the display apparatus 10 is spaced apart from the case 201 by a distance indicated as G3. In this case, a length of the height adjusting member 203 may be changed and thus, the fastening member 202 may be selected and/or adjusted to have an appropriate length in consideration of the length of the height adjusting member 203.

An operator may adjust the distance G3 between the rear surface of the display apparatus 10 and the wall by selectively using the height adjusting member 203. In particular, for example, a jack, such as a cable jack, may be installed to the rear surface of the display apparatus 10. In this case, it may be necessary to separate the rear surface of the display apparatus 10 from the wall by an appropriate distance for installation of the jack.

Figure 24:
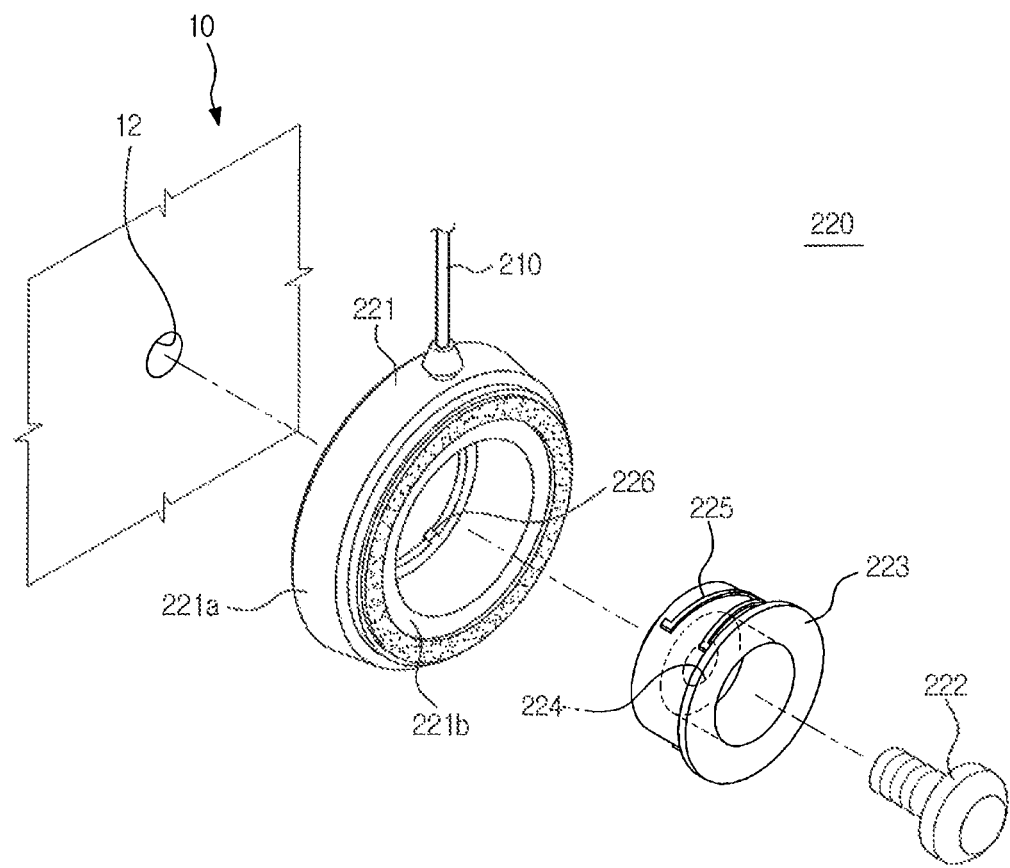
FIG. 24 is an exploded perspective view illustrating an exemplary embodiment of the present general inventive concept of the fixing unit provided in a supporting device to a display apparatus illustrated in FIG. 2.
Figure 25:
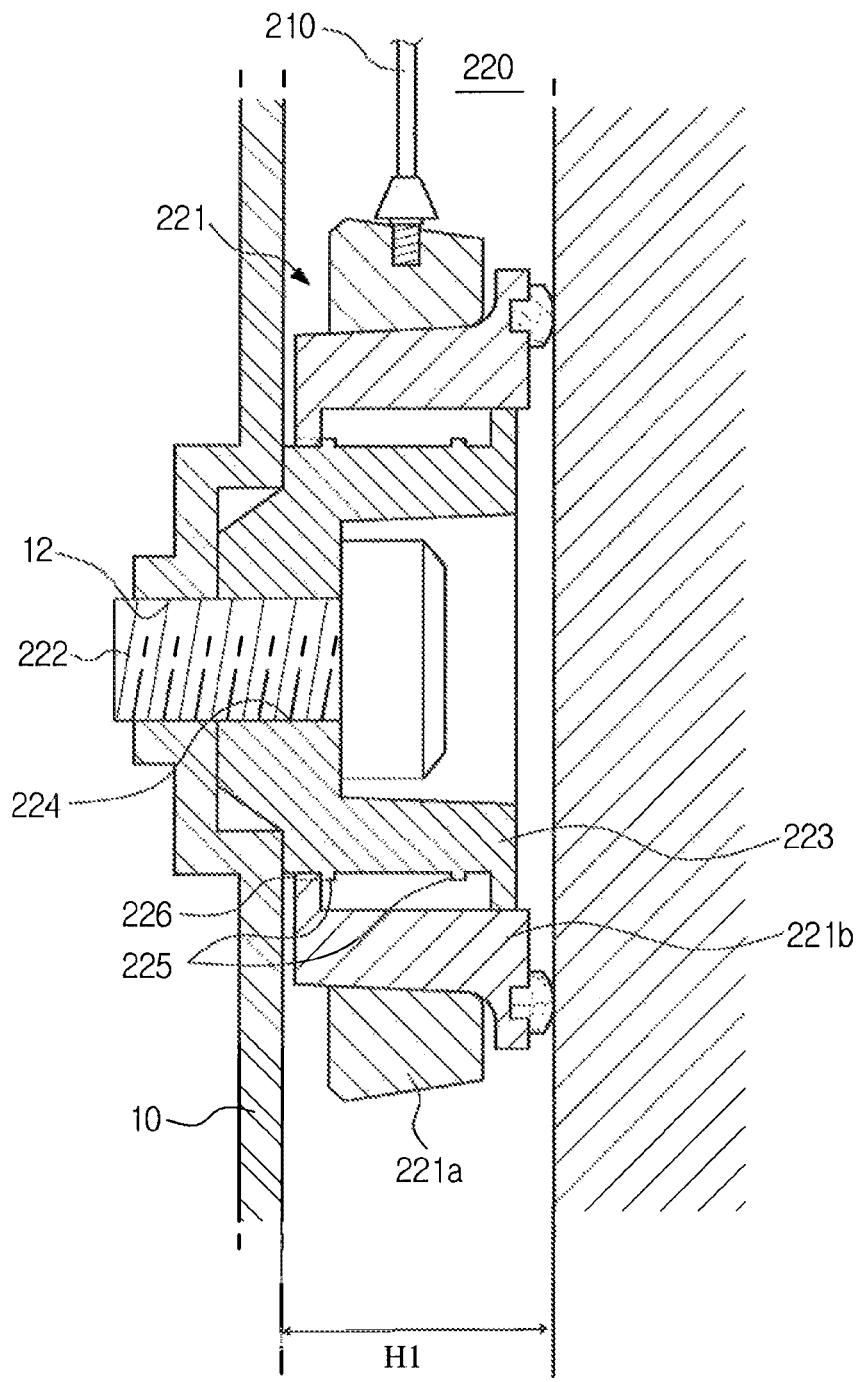
FIGS. 25 and 26 are views illustrating a coupled state of the fixing unit corresponding to FIG. 21.
Figure 26:
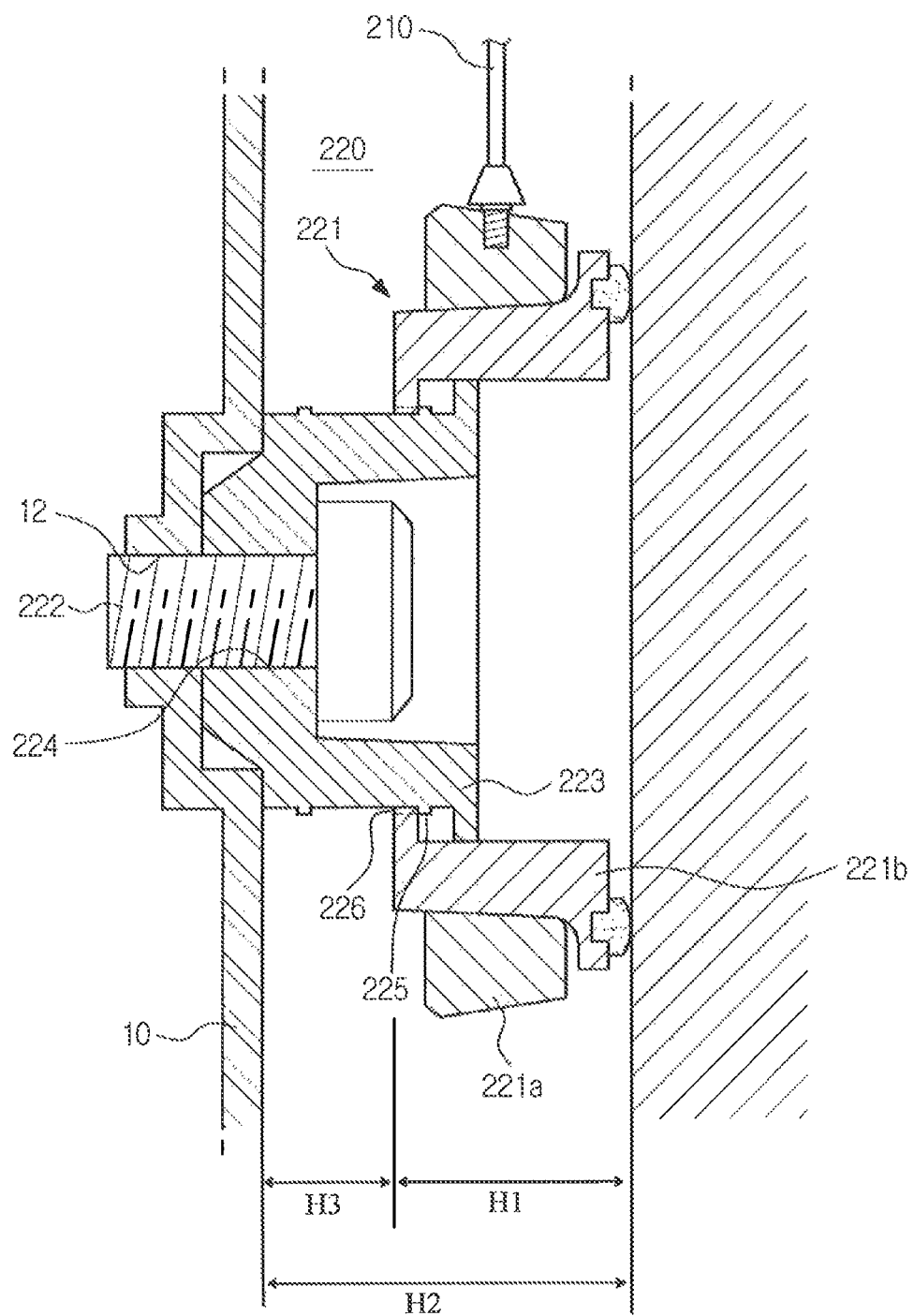

FIG. 24 is an exploded perspective view illustrating an exemplary embodiment of the present general inventive concept of the fixing unit provided in a supporting device to a display apparatus illustrated in FIG. 2, and FIGS. 25 and 26 are views illustrating a coupled state of the fixing unit corresponding to FIG. 21.

The exemplary embodiment of FIG. 24 differs only in the configuration of the fixing unit as compared to the above-described exemplary embodiment of FIG. 2 and other exemplary embodiments of the present general inventive concept, and other configurations of the exemplary embodiment may be equal to those of any one of the exemplary embodiments of the present general inventive concept.

A fixing unit 220 according to the present exemplary embodiment, as illustrated in FIGS. 24 to 26, may include a case 221, a fastening member 222, and a height adjusting member 223.

The case 221 may include a first case 221a and a second case 221b. The first case 221a and the second case 221b may be integrated to form a single unit.

A wire part 210 may be coupled to the case 221. The case 221 and the wire part 210 may be coupled to each other via a coupling configuration selected from those illustrated in FIGS. 2, 14, 15, 16 and 18, whereby it may be possible to prevent the wire part 210 from separating from the case 221.

The case 221 and the height adjusting member 223 may be integrated to form a single unit. The height adjusting member 223 may have a center fastening hole 224, such as a screw hole, etc., and a fastening member 222, such as a fastening screw, etc., may be inserted into the fastening hole 224, whereby the case 221 and the height adjusting member 223 of the single unit may be fixed to the rear surface of the display apparatus 10.

The height adjusting member 223 may be coupled to the case 221 so as to be movable relative to the case 221. The coupling of the height adjusting member 223 and the case 221 may be realized via screw fastening. Specifically, the height adjusting member 223 is inserted through the center of the case 221, and screw fastening configurations may be formed at contact regions of the height adjusting member 223 and the case 221. For example, the height adjusting member 223 may have formed at an outer surface thereof a screwing protrusion 225, and the case 221 may have formed at an inner surface thereof a holding protrusion 226 corresponding to the screwing protrusion 225. Accordingly, as the height adjusting member 223 rotates relative to the case 221, the height adjusting member 223 may be pushed into or extended out of the case 221.

An operator may adjust a distance between the rear surface of the display apparatus 10 and the wall, indicated as H1 in FTC, 25, by operating the height adjusting member 223. To move the rear surface of the display apparatus 10 away from the wall, the height adjusting member 223 may rotate in a given direction relative to the case 221 so as to be extended out of the case 221 (FIG. 26). After this adjustment of the height adjusting member 223, the fixing unit 220 may be fixed to the rear surface of the display apparatus 10 by use of the fastening member 222 so that the rear surface of the display apparatus is separated from the wall by a distance H2, while the rear surface of the display apparatus 10 is separated from the case 221 by a distance H3. On the other hand, to keep the rear surface of the display apparatus 10 close to the wall, the height adjusting member 223 may rotate in an opposite direction relative to the case so as to be pushed into the case 221 (FIG. 25). After this arrangement of the height adjusting member 223, the fixing unit 220 may be fixed to the rear surface of the display apparatus 10 by use of the fastening member 222.

With this configuration, when it is desired to install a jack to the rear surface of the display apparatus 10, it may be possible to adjust the fixing unit 220 to assure an appropriate distance between the rear surface of the display apparatus 10 and the wall to permit the installation of the jack.

Figure 27:
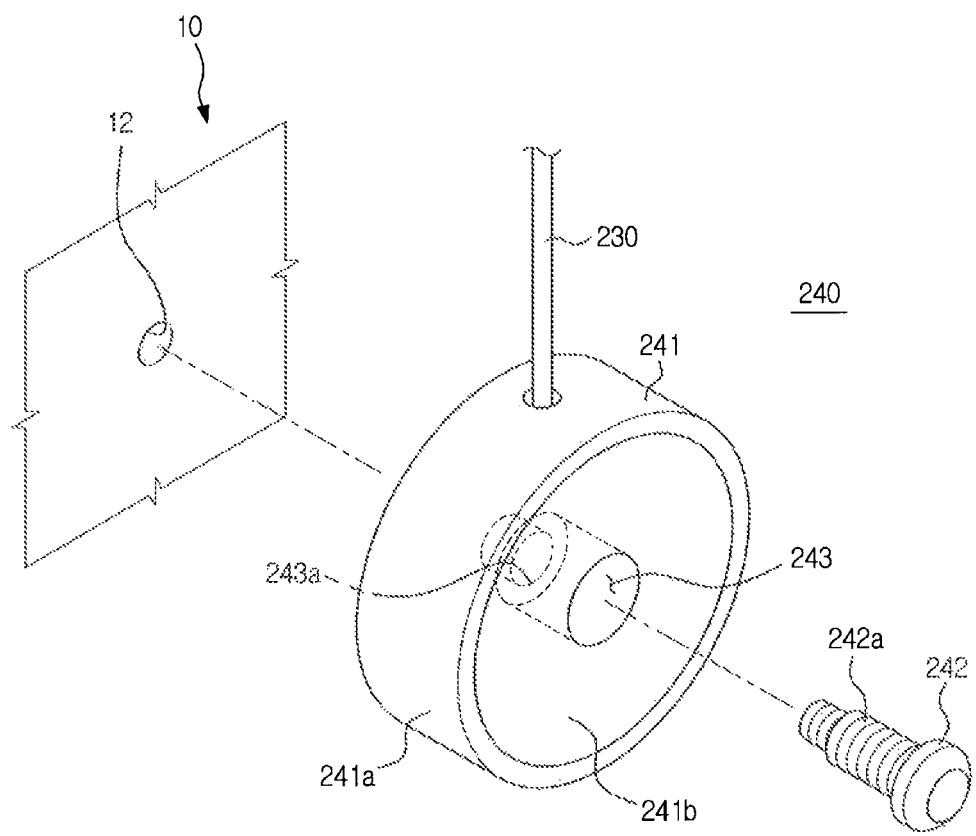
FIG. 27 is an exploded perspective view illustrating an exemplary embodiment of the present general inventive concept of the fixing unit provided in a supporting device to a display apparatus illustrated in FIG. 2.
Figure 28:
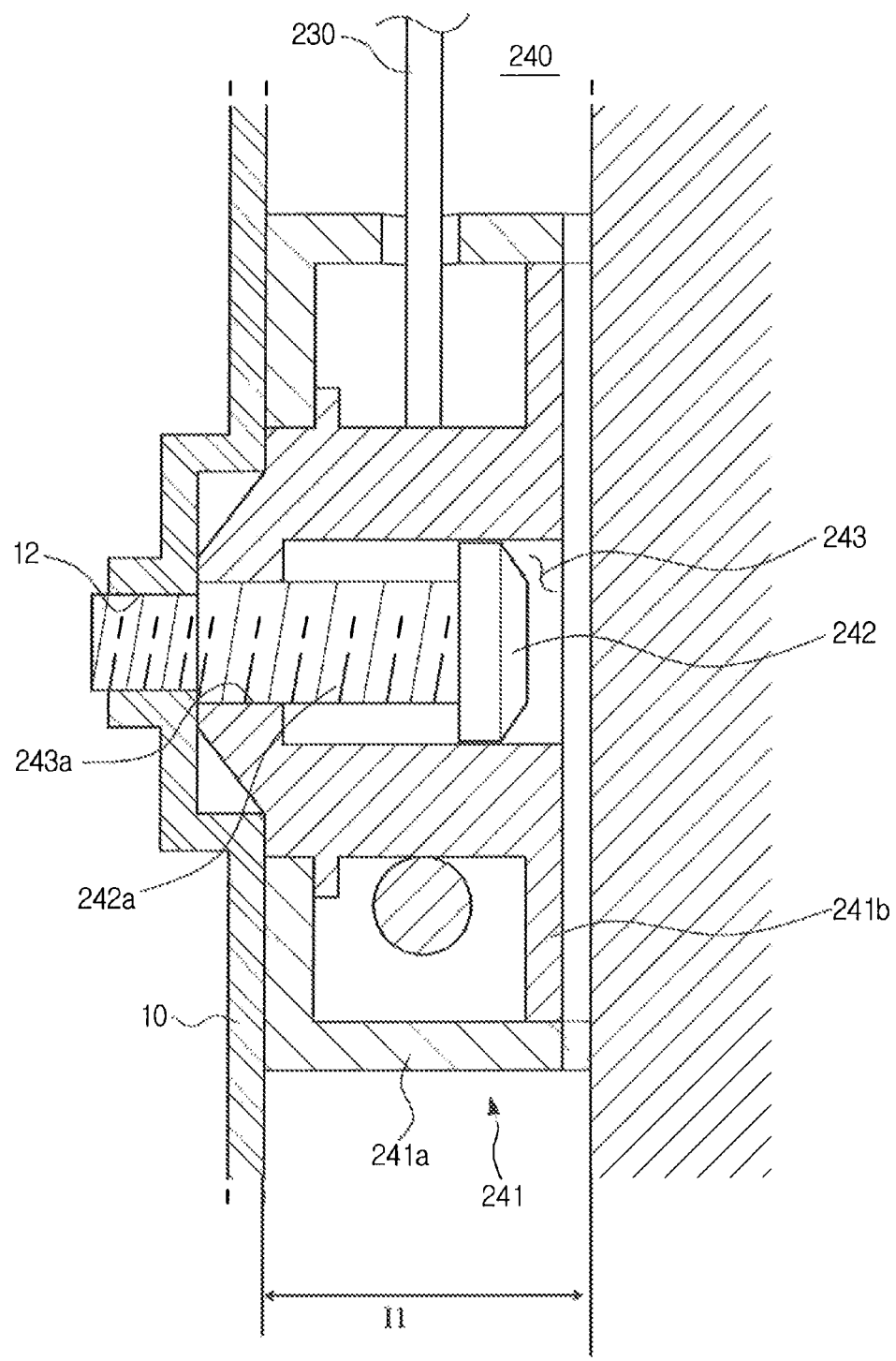
FIGS. 28 and 29 are views illustrating a coupled state of the fixing unit corresponding to FIG. 27.
Figure 29:
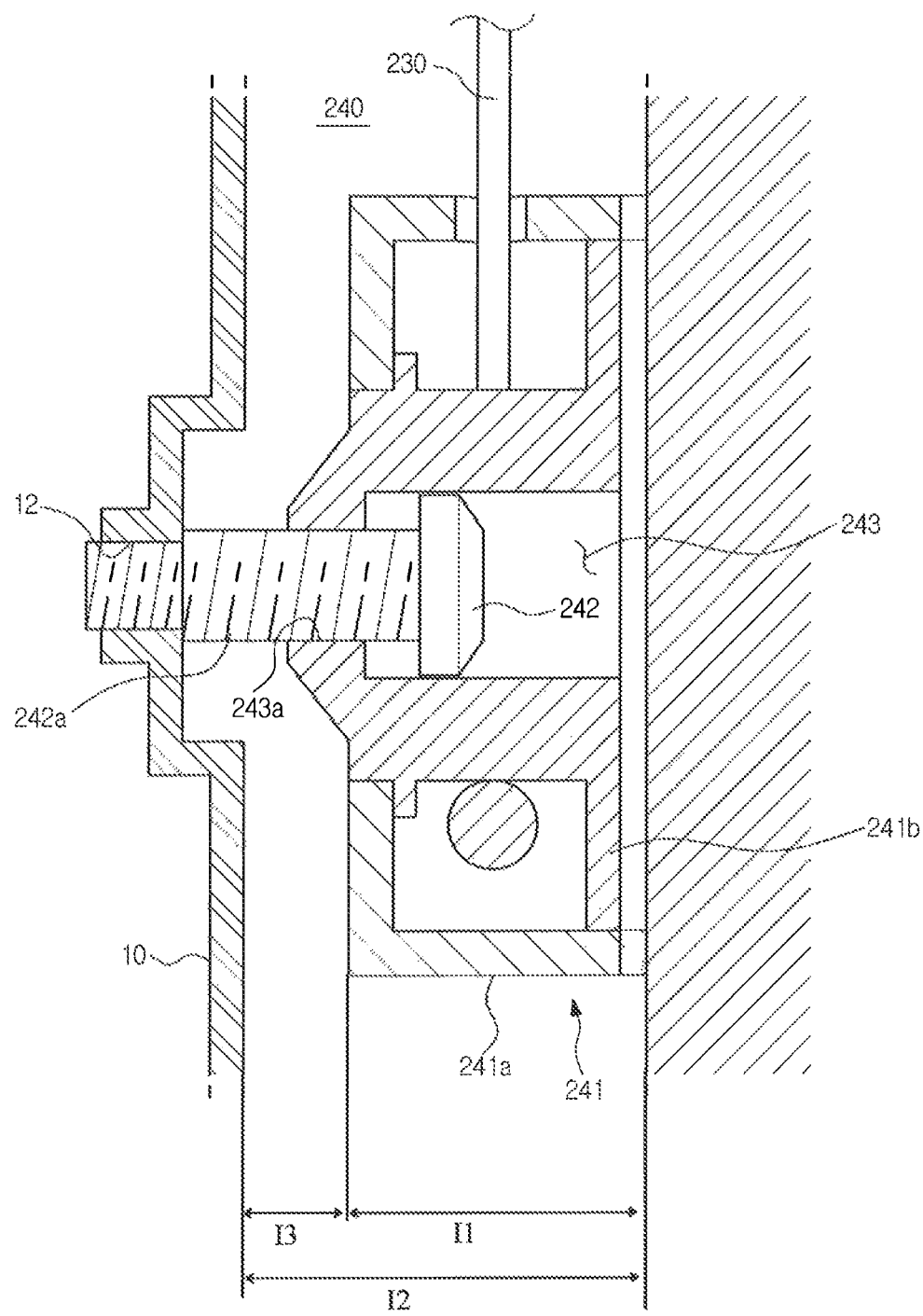

FIG. 27 is an exploded perspective view illustrating an exemplary embodiment of the present general inventive concept of the fixing unit provided in a supporting device to a display apparatus illustrated in FIG. 2, and FIGS. 28 and 29 are views illustrating a coupled state of the fixing unit corresponding to FIG. 27.

The exemplary embodiment of FIG. 27 differs only in the configuration of the fixing unit as compared to the above-described exemplary embodiment of FIG. 2 and other exemplary embodiments of the present general inventive concept, and other configurations of the exemplary embodiment may be equal to those of any one of the embodiments of the present general inventive concept.

A fixing unit 240 according to the present exemplary embodiment, as illustrated in FIGS. 27 to 29, may include a case 241 and a fastening member 242.

The case 241 may include a first case 241a and a second case 241b. The first case 241a and the second case 241b may be used together and integrated to form a single unit.

A wire part 230 may be coupled to the case 241. The case 241 and the wire part 230 may be coupled to each other via a coupling configuration selected from those illustrated in FIGS. 2, 14, 15, 16 and 18, whereby it may be possible to prevent the wire part 230 from separating from the case 241.

The case 241 may be located between the display apparatus 10 and the wall, and may be fixed to the rear surface of the display apparatus 10. The case 241 may have a center fastening hole 243, such as a screw hole, etc., and the fastening member 242, such as a fastening screw, etc., may be inserted into the fastening hole 243. Accordingly, as the fastening member 242 is inserted into the fastening hole 243, the case 241 may be fixed to the rear surface of the display apparatus 10.

The fastening member 242 is inserted through the center of the case 241, so as to be movably coupled to the case 241. The coupling of the fastening member 242 and the case 241 may be realized via screw fastening. For this, the fastening member 242 may have formed at an outer peripheral surface thereof a first screw thread 242a and the fastening hole 242 may have formed at an inner peripheral surface thereof a second screw thread 243a corresponding to the first screw thread 242a. In addition, the fastening member 242 may have a first portion 242b and a second portion 242c. The first portion 242b may a diameter of d1, and the second portion 242c may have a diameter of d2, which is larger than the diameter d1 of the first portion 242b of the fastening member 242. The first portion 242b is inserted into the hole 12 on rear surface of the display apparatus 10 and the second portion 242c has the first screw thread 242a formed on a surface thereof and another surface of the second portion 242c contacts the rear surface of the display apparatus 10. Accordingly, as the case 241 rotates relative to the fastening member 242 in a state wherein the fastening member 242 is fixed to the rear surface of the display apparatus 10, the case 241 may be moved in a longitudinal direction of the fastening member 242.

An operator may adjust a distance between the rear surface of the display apparatus 10 and the wall by rotating the case 241 relative to the fastening member 242. To move the rear surface of the display apparatus 10 away from the wall (FIG. 29), the case 241 may rotate relative to the fastening member 242 fixed to the rear surface of the display apparatus 10, thereby being adjusted to move away from the rear surface of the display apparatus 10 by a distance indicated as I3, while the rear surface of the display apparatus 10 is moved away from the wall a distance indicated as I2. On the contrary, to keep the rear surface of the display apparatus 10 close to the wall (a distance indicated as I1 in FIG. 28), the case 241 may rotate relative to the fastening member 242 fixed to the rear surface of the display apparatus 10, thereby being adjusted to move toward the rear surface of the display apparatus 10.

With this configuration, when it is desired to install a jack to the rear surface of the display apparatus 10, it may be possible to adjust the fixing unit 240 so as to assure an appropriate distance between the rear surface of the display apparatus 10 and the wall.

As apparent from the above description, one exemplary embodiment of the present general inventive concept provides a supporting device to a display apparatus having a separation protector to be mounted to a wire hanger while covering a wire part. Even if the wire part is moved in response to motion of the display apparatus, it may be possible to prevent the wire part from being separated from the wire hanger with the use of the separation protector.

Another exemplary embodiment of the present general inventive concept provides a supporting device to a display apparatus, in which a wire part length may be easily changed according to products.

Further, when the display apparatus is moved to another location, the display apparatus may be easily reinstalled by adjusting a distance between a rear surface of the display apparatus and a wall.

Although the exemplary embodiments of the present general inventive concept have been illustrated and described, it would be appreciated by those skilled in the art that changes may be made in these exemplary embodiments without departing from the principles and spirit of the present general inventive concept, the scope of which is defined in the claims and their equivalents.

What is claimed is:

1. A supporting device usable with an electronic display apparatus to fix the electronic display apparatus to a wall, the electronic display apparatus having a plurality of holes that are pre-formed in a rear surface thereof, the supporting device comprising:
   a pair of fixing units to be coupled to the rear surface of the electronic display apparatus;
   a wire extending between the pair of fixing units;
   a wire hanger to be engaged with the wire; and
   at least one spacing member to be coupled to at least one hole of the plurality of holes that are pre-formed in the rear surface of the electronic display apparatus, a rotating arm rotatably mounted to one of the at least one spacing member, the rotating arm moveable to tilt the electronic apparatus so as to space a lower portion of the rear surface of the electronic display apparatus from the wall by a distance, the at least one spacing member including a supporting portion to control rotation of the rotating arm, the supporting portion being separate from the rotating arm,
   wherein the at least one spacing member includes a surface to face the wall, and a first buffer member, at least a portion of which is arranged to be between the wall and the surface of the spacing member, and
   wherein the at least one spacing member is to be detachably screwed to the at least one of the plurality of holes that are pre-formed in the rear surface of the electronic display apparatus with at least one screw,
   the at least one spacing member further including a recess to accommodate the screw, and
   the portion of the first buffer member is arranged near the recess.

2. The supporting device according to claim 1, wherein the wire is configured to extend outwardly from an outer periphery of each of the fixing units.

3. The supporting device according to claim 1, wherein each of the fixing units includes a surface to face the wall, and a second buffer member, at least a portion of which is arranged to be between the wall and the surface of the fixing unit.

4. The supporting device according to claim 1, wherein each end of the wire is provided with a first separation protector to prevent the wire from being separated from the fixing unit.

5. The supporting device according to claim 4, wherein each of the fixing units includes a first case to define the outer periphery, and a second case coupled with the first case to define an interior space adapted to receive the first separation protector.

6. The supporting device according to claim 4, wherein each of the fixing units includes a first case to define the outer periphery and a second case coupled with the first case, and the first separation protector is coupled to at least one of the first case and the second case of the fixing unit.

7. The supporting device according to claim 1, wherein the wire hanger includes a head portion, a wall supporting portion configured to come into contact with the wall, and a receiving portion provided between the head portion and the wall supporting portion, the receiving portion serving to catch the wire, and the supporting device further comprising a second separation protector including a body arranged on the wall supporting portion of the wire hanger, the body of the second separation protector including at least one protrusion protruding from the body so as to protect the wire from becoming separated from the wire hanger.

8. A supporting device usable with an electronic display apparatus to fix the electronic display apparatus to a wall, the supporting device comprising:

a pair of fixing units to be coupled to the rear surface of the electronic display apparatus;

a wire extending between the pair of fixing units;

a wire hanger to be engaged with the wire;

a first spacing member including a supporting portion; and a rotating arm rotatably mounted to the first spacing member, the rotating arm moveable to tilt the electronic apparatus so as to space a lower portion of the rear surface of the electronic display apparatus from the wall by a distance, the rotating arm being limited in an angle of rotation by the supporting portion, and the supporting portion being separate from the rotating arm, wherein the first spacing member is to be coupled to the rear surface of the electronic display apparatus, wherein the first spacing member includes a buffer member that is arranged to be between the surface of the first spacing member and the wall, and wherein the buffer member is formed on a rim of the first spacing member.

9. A supporting device usable with an electronic display apparatus to fix the electronic display apparatus to a wall, the supporting device comprising:

a pair of fixing units to be coupled to the rear surface of the electronic display apparatus;

a wire extending between the pair of fixing units;

a wire hanger to be engaged with the wire;

a first spacing member including a supporting portion;

a rotating arm rotatably mounted to the first spacing member, the rotating arm moveable to tilt the electronic apparatus so as to space a lower portion of the rear surface of the electronic display apparatus from the wall by a distance, the rotating arm being limited in an angle of rotation by the supporting portion, and the supporting portion being separate from the rotating arm, wherein the first spacing member is to be coupled to the rear surface of the electronic display apparatus, and wherein the first spacing member includes a buffer member that is arranged to be between the surface of the first spacing member and the wall; and a second spacing member to be coupled to a lower portion of the rear surface of the electronic display apparatus, the second spacing member configured to space the rear surface of the electronic display apparatus from the wall by the distance.

10. The supporting device according to claim 1, wherein the first buffer member is made of a material which absorbs shock, and wherein the first buffer member dampens shock caused when the electronic display apparatus comes into contact with the wall.

\* \* \* \* \*